Figure 1:
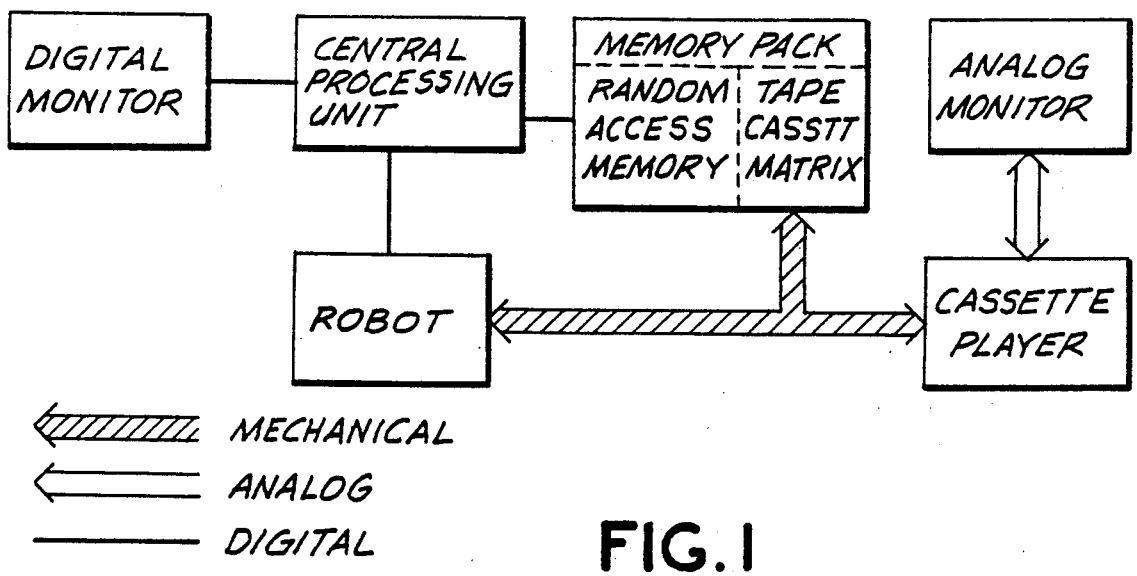

United States Patent [19]

Kuo

[11] Patent Number: 4,989,191
[45] Date of Patent: Jan. 29, 1991

[54] DATA PROCESSING SYSTEM WITH MIXED MEDIA MEMORY PACKS

[75] Inventor: Sheafen F. Kuo, Staten Island, N.Y.

[73] Assignee: Frank Sheafen Kuo, Staten Island, N.Y.

[21] Appl. No.: 292,922

[22] Filed: Jan. 3, 1989

[51] Int. Cl.⁵ .............................................. G11B 17/22
[52] U.S. Cl. ........................................ 369/33; 369/32; 369/36
[58] Field of Search ..................... 369/32, 36, 38, 39; 360/78.03, 92

[56] References Cited

U.S. PATENT DOCUMENTS

| | | | |
|---|---|---|---|
| 3,845,004 | 12/1974 | Baum et al. | 360/92 |
| 4,145,724 | 3/1979 | Medding et al. | 360/92 |
| 4,502,133 | 2/1985 | Siryi et al. | 369/34 |
| 4,504,936 | 3/1985 | Faber et al. | 369/34 |
| 4,731,682 | 3/1988 | Nishiyama et al. | 360/92 |
| 4,792,865 | 12/1988 | Baumeister | 369/34 |
| 4,796,099 | 1/1989 | Compton | 369/32 |
| 4,815,070 | 3/1989 | Fago | 369/36 |
| 4,817,070 | 3/1989 | Hug et al. | 369/36 |

Primary Examiner—Stuart S. Levy
Assistant Examiner—Kenneth B. Wells
Attorney, Agent, or Firm—McAulay Fisher Nissen & Goldberg

[57] ABSTRACT

A Data Storage Pack is disclosed which contains in the same housing (a) a plurality of analog data storage units such as video tape arranged in a two dimensional matrix and (b) a RAM data storage unit. The data in RAM identifies and locates the video data by tape unit in the matrix and location on the tape. The RAM memory units of a plurality of these packs are connected to a central processing unit to permit merger of the digital identification data and thus more efficient use of the RAM space. Pairs of these data storage packs may be stacked spaced from one another. A robot arm and a tape player positioned between the stacks are under control of the RAM data to select and play the desired analog information from the appropriate portion of the appropriate tape in the matrix involved. There are disclosed an advantageous multiple tape cassette arrangement, an advantageous electric motor arrangement for designing and selecting a disk when such is employed as the analog data unit in said matrix, an advantageous robot arm arrangement, and an advantageous data interleaving system for the analog tape.

14 Claims, 14 Drawing Sheets

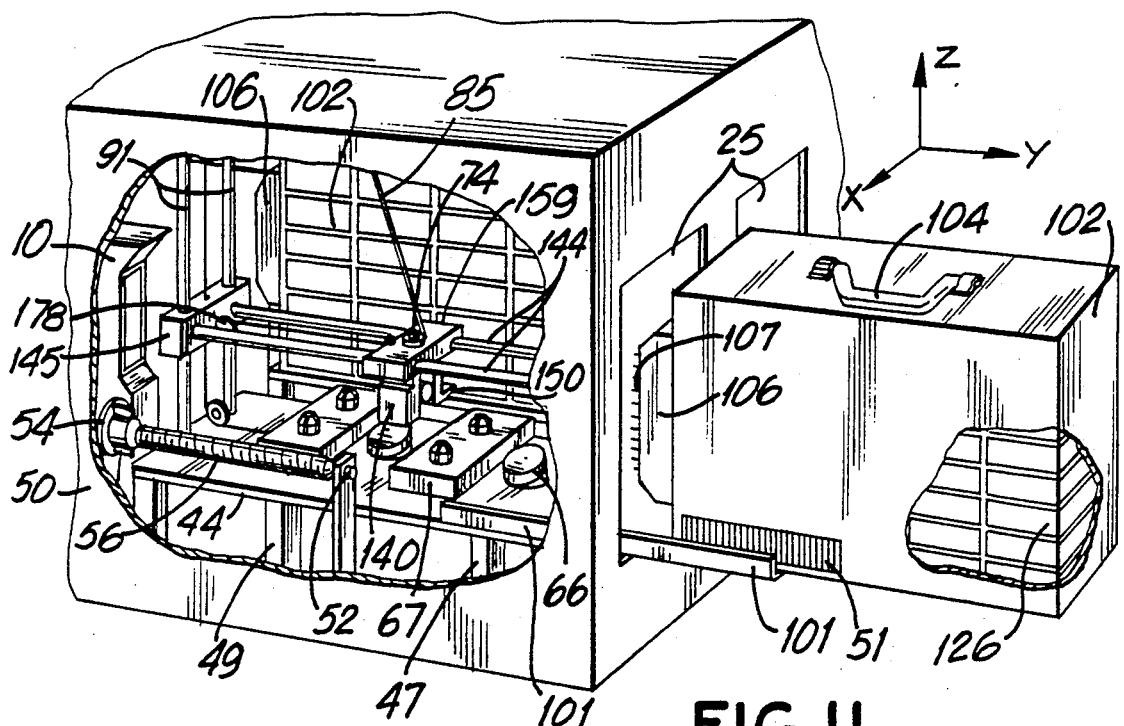
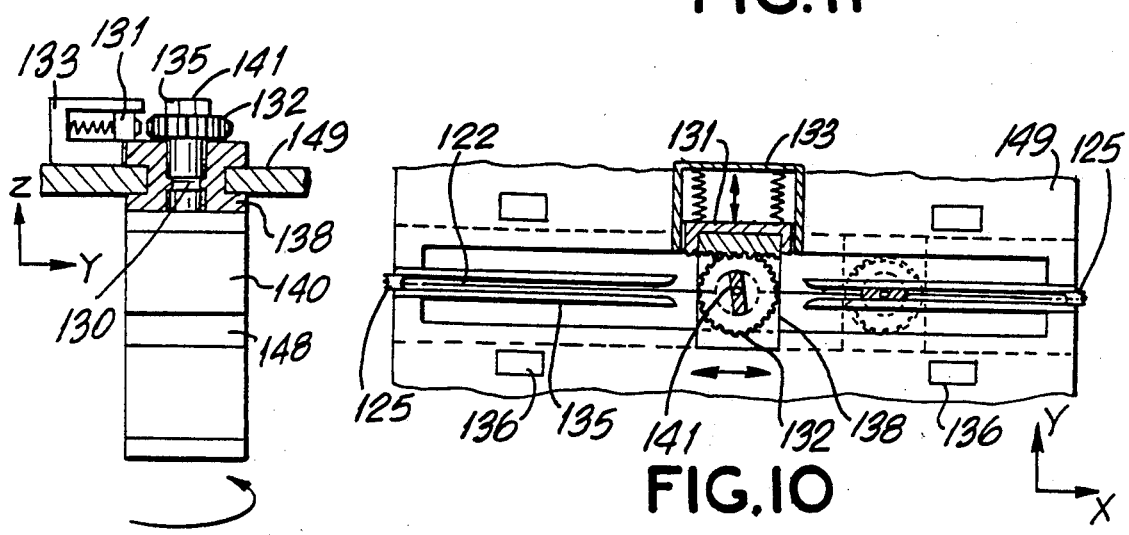
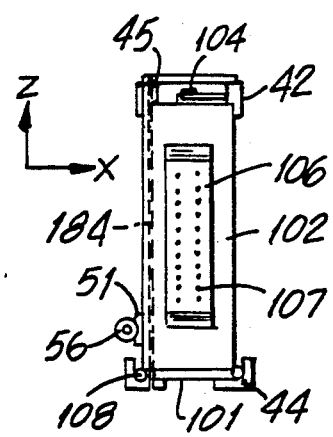

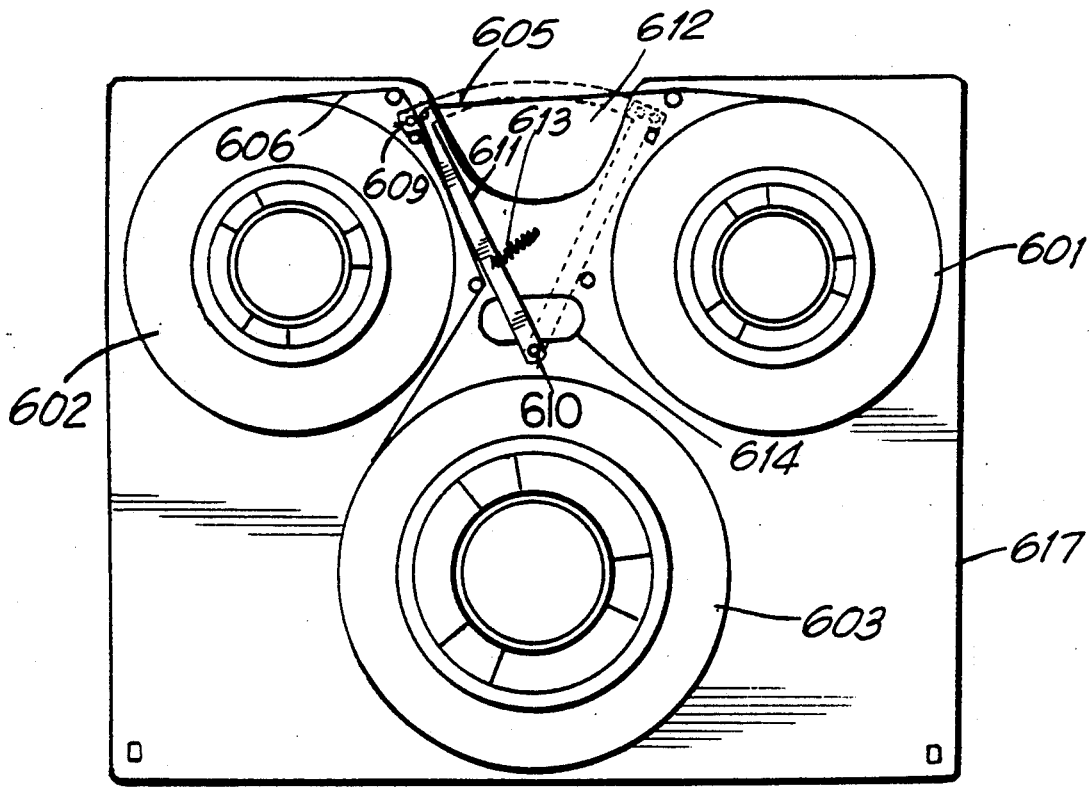
FIG.14
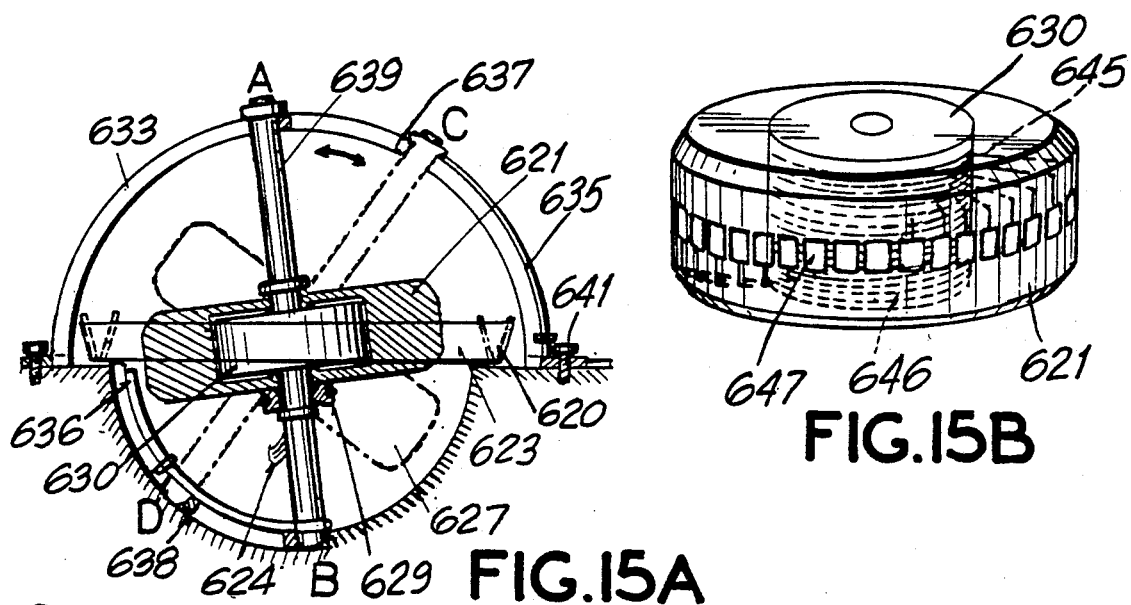
FIG.15A
FIG.15B
FIG.15C

WAIT ------  FCd ////
GC/RC □     FCb ////
DB ———

DATA PROCESSING SYSTEM WITH MIXED MEDIA MEMORY PACKS

I. BACKGROUND OF THE INVENTION

The present invention relates in general to an advantageous combination of two different types of stored data and more particularly to a system in which data in a high capacity format such as analog data contained in a first media is combined with a data in a media where the speed of retrieval is relatively fast such as digital data in random access memory (RAM).

The purpose of this invention is to combine high access speed memory with high capacity memory in a fashion that provides the most advantageous features of both. The advantage of said high speed memory, particularly in the form of digital random access memory (RAM), is that it permits rapid access to the desired data. The advantage of said high capacity memory (preferable analog) in the form of sequential tape is that it provides both economic and quantity storage of data.

Accordingly, it is a major purpose of the invention to provide such an interrelated combination of digital memory in RAM form with sequential memory, preferable in multi-unit form, to provide an optimum combination of speed of access and large data storage.

To put it another way, it is a major purpose of this invention to provide an optimum combination of (a) the speed of access of random access memory and (b) the data density and economic advantage of high capacity analog memory

II. DESCRIPTION OF THE PRIoR ART

First, there are devices using a plural number of cassettes as analog data storage such as central dictation system using cassette exchanger. The examples are U.S. Pat. Nos. 4,663,680; 4,636,888; 4,622,610. But those arts do not have indexing ability. Therefore, the user can not select a cassette according to some key information. Also, they do not provide variable length records nor direct accessibility of records in the cassette. In short, they are not controlled by a CPU or processor, they cannot be considered as computer memory.

A second category of the prior art relates to random access digital data storage apparatus such as U.S. Pat. No. 4,563,716. This and other prior arts such as disc storage cannot read/write analog data easily without analog to digital conversion. Analog records such as video record require tremendous memory if converted to digital. In addition, those prior arts cannot address ultra large storage, a trillion bytes (or more) digital or equivalent (through conversion) analog information.

A third category of the prior art is related to the apparatus using a plural number of read/write mechanisms. Example such as U.S. Pat. No. 4,551,775 which provides uninterrupted record playing. But those apparatuses and other tape drive mechanisms did not provide the ability of ultra large tape storage nor computer controlled processing.

A fourth category is the advanced main and buffer memory techniques, such as U.S. Pat. Nos. 4,774,687, 4,774,654, 4774,653. They are all related to high speed direct access digital memory management. They are not for low cost, high capacity auxiliary memory which this invention is related to.

A fifth category is the industrial robot or three dimensional manipulator since current invention uses three dimensional transporter to pick up, insert, transport, mount, dismount a cassette tape. The prior art of this category such as U.S. Pat. Nos. 4,596,509; 4,595,335; 4,604,027 or 4,566,346 has limited distance on its Z axis (vertical). In U.S. Pat. No. 4,583,909, it is difficult to extent the distance on its X or Y axises with extended Z axis. U.S. Pat. No. 4,566,836 or 4,597,707 and other arts are specialized to do jobs other than load/unload and transport the cassette tape.

A sixth category is the hybrid computer since this invention is a computer system capable of storing and processing digital and analog data. But the computer system of this invention is not a hybrid computer by traditional standard either, although circuits of this invention involve both digital and analog. But all its CPU or ALU (arithmetic logic unit) are pure digital. The ability of high speed processing/storing both digital and analog data (either video or audio) without A/D or D/A conversion makes this invention different from other analog or hybrid invention such as U.S. Pat. Nos. 4,445,189, 4,543,640, 4,417,317.

It is one of the major goals of this invention to process and store digital and analog information simultaneously. Since all analog data can be converted to digital, why is it needed to process and store both digital and analog data ?

1. It takes extraordinary large memory storage especially video data, to be converted to digital. For example, it will take 3.87 megabits of digital memory to store one frame of color TV picture with reasonable quality.

It will take 25 to 60 frames or 96 to 232 megabits to produce one second of video information. The memory compresion techniques for digitizing the video signal may reduce the memory requirement somewhat. But it nevertheless can never eliminate the memory shortage problem for general purpose quality video data storage and processing.

2. The speed requirement for digital video challenges even the highest speed media such as RAM chips. Some high speed real time imaging applications reqire 500 frames per second, or nearly 2 gigabits per second. Most low cost sequential digital media such as tape or disk has less than one hundred megabits per second transfer speed, hence difficult to become video memory without compromising the quality.

3. There are many existing terminals such as audio & video receiver, tape recorder/player, TV terminal, microphone, camcorder, telephone are analog devices. Since human's eyes and ears are analog devices, digital signals eventually have to be converted to analog to be accepted. High quality A/D and D/A conversions are costly even if memory and speed are not problems.

III. BRIEF DESCRIPTION

In brief, one embodiment of this invention is a system for storing and accessing data that employs a plurality of separate individual memory packs. Each pack contains digital memory called random access memory (RAM) and a matrix of high capacity memory units such as analog tapes. Each tape has a predetermined position in the matrix. A record processed by the system contains both a digital part and an analog part. Each analog tape contains a number of analog records. The digital data and analog data are correlated to one another in a specific predetermined fashion so that analog data in the form of pictures and digital data in the form of description can be simultaneously presented.

A record identification (ID) is uniquely maintained for each record in the system. Each record is located by pack ID, tape ID and record address. Using tape ID and record address, the central processing unit (CPU) controls a robotic selector for selecting the tape desired and positioning it at an available player unit. This record ID is determined by application software using user inputed digital data.

The analog data on the tape in the memory pack represents a substantial number of separate records. Each record is broken up into a number of segments. The segments of each record are distributed and interlaced throughout the tape in such a fashion that both the first and the last segment of an record is located close to the beginning of the tape. As the tape is scrolled the first segment of the record desired is put in a first buffer for immediate display. During the course of that display, the tape is scrolled to the second segment which is put into a second buffer that permits continuous display of the picture after the image in the first buffer has been completed. This continues sequentially until the last segment is placed in one of the buffers for display to complete the record. However the segments are so distributed in the tape that the tape initially scrolls forward locating about half of the segments of the record involved and then scrolls back until the last segment displayed is done that is close to the beginning of the tape. In this fashion, fairly immediate access is obtained to each record without having to wait for scrolling through the tape to where a record might be located if the records were simply placed on the tape in sequential fashion.

IV. THE OBJECTIVES, ADVANTAGES AND SUMMARY OF THIS INVENTION

The major objectives of this invention includes:

Physically combining digital (RAM) and analog memory (NxM tape cassette cabinet) into one unit (D/A memory pack)

Logically combining digital data and analog data into one record

Direct accessibility of any digital/analog record

The expendability of the ultra large digital/analog memory without compromising the response time The modulization of the system architecture to allow easy adoption advanced digital computer technologies as well as TV, video technologies as they come.

In prior arts, a record is normally organized as either analog data or digital data. This invention combines logical related digital data and analog data into one record. The digital data is stored in fast speed RAM, the analog data is stored in large volume low speed media units advantages are:

1. The digital data efficiently represents number and text, analog data (such as video record) vividly describes motion pictures and sound. Both digital and analog data are needed to better describe an event, concept or message.

2. When searching, merging or sorting, only the key (digital) part is searched merged or sorted. This creates much faster result since key is in RAM, and is shorter than the entire record.

3. Use digital to drive analog data. For each record, there is a record ID as part of a digital record which is also the address of the analog part of the record in the tape matrix. (For example, A5-94-0387 means the record is at 0387 offset from the beginning of the cassette tape which is at column 9 and row 4 of the tape matrix A5. The vertical stepping motor and the horizontal stepping motor of the robot for matrix A5 will work simultaneously to let robot to get the tape cassette at (9,4) and move it to the tape driver. Then the tape driver will position the tape to 0387 using the current tape position table stored in the RAM).

4. With the novel magnetic tape technologies and robotic tape cassette selector to be disclosed later, digital data provides the random accessibility of data in huge analog tape library.

5. With the GLOBAL mode of the RAM of each memory pack, the key (digital) part of records in all packs can be mergied, compressed and sorted to make the retrival efficient. All the global RAMs become main memory of CPU. Contrast to most other peripheral devices, the more packs are added the more efficent the system will be due to added main memory.

To accomplish the above objectives, a data processing system with large mixed media memory packs provides:

1. Ultra large memory storage, up to hundreds of trillion bytes digital or equivalent analog information, stored in a large number of memory packs;

2. The memory packs, each of them comprising of a solid state device which stores random access memory (RAM) and a tape cabinet which stores N by M cassette tapes. Those two types of medium are physically inseparable and are mounted, stored, and shipped out as one unit;

3. A method to create, store and process DIGITAL/ANALOG records, a DIGITAL/ANALOG record is a record comprising of digital part and analog part, both parts are logically related to be considered as a single record;

4. A direct/random accessibility to any record which consists of both digital and analog data;

5. The magnetic tape technologies in hardware and software to overcome the most disadvantage of the tape—the random accessibility of a record on the tape, includes:

Tape Access Method (TAM) - the record segmentation and the round trip recording;

Muti-reel cassette such as quint-reel cassette tape makes the random accessibility about quadruplely improved;

Tape buffer pool and analog resources scheduler further reduce the random access time and support the multiprocessing;

6. Video read/write head technologies which can copy video/audio signal from one tape to another with speed 20 to 30 times faster than normal speed. The same head can also have normal speed mode;

7. Tape transporters (a specially designed shuttle and robot) to fast move the cassette tape between the cabinet bin and the play deck;

8. A programmable analog communication controller which provides efficient switching, monitoring and tally functions of a complex analog communication network. This controller can be used as a building block to form an extremely complex analog communication control;

9. A time/control trackless helical scan method which can store more data per tape length be used for both video and digital tape recording;

10. Digital coding on TV and video signal to provide addressing, delimiter, directional information;

11. Twin deck helical scan tape player which allows two cassettes to share one head drum alternatively;

12. Asynchronized co-axis multi-shaft motor which can drive a stack of disks or drums under extremely compact environment and each disk/drum can be driven independently.

Although it is the primary application of this invention to process and store both digital and analog data, this invention can be applied to pure digital data processing and storage. It simply changes the read/write mechanism and the communication devices from analog to digital. Most techniques used in this invention can be applied to disk storage in lieu of tape storage without structural modification.

Other objects and further features of the present invention will be apparent from the following detailed description when read in conjunction with the accompany drawings.

V. BRIEF DESCRIPTION OF DRAWINGS

The following figures are of a single embodiment in which the Z-axis is vertical, the X-axis is the longitudinal of the cassette cabinet 102 (in FIG. 1A, 5, 11) and the Y-axis is along the depth of the cassette cabinet:

FIG. 1. A simplified block diagram to show certain basic components of the system.

Figure 1A:
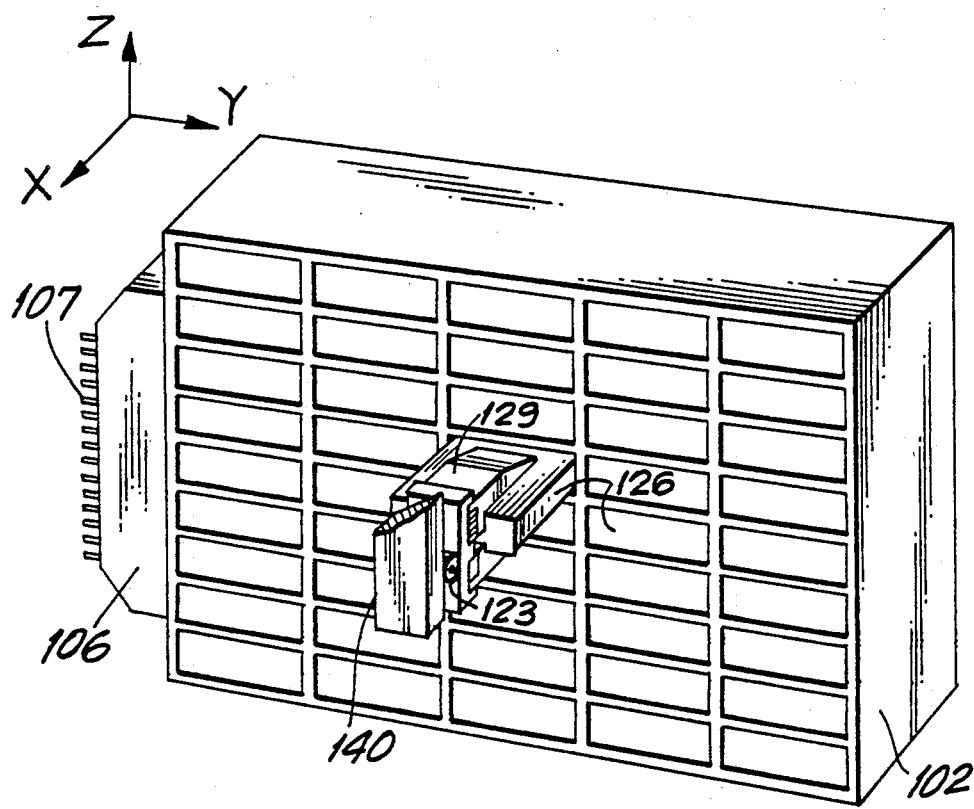

FIG. 1A. A perspective view of a mixed media memory pack.

Figure 1B:
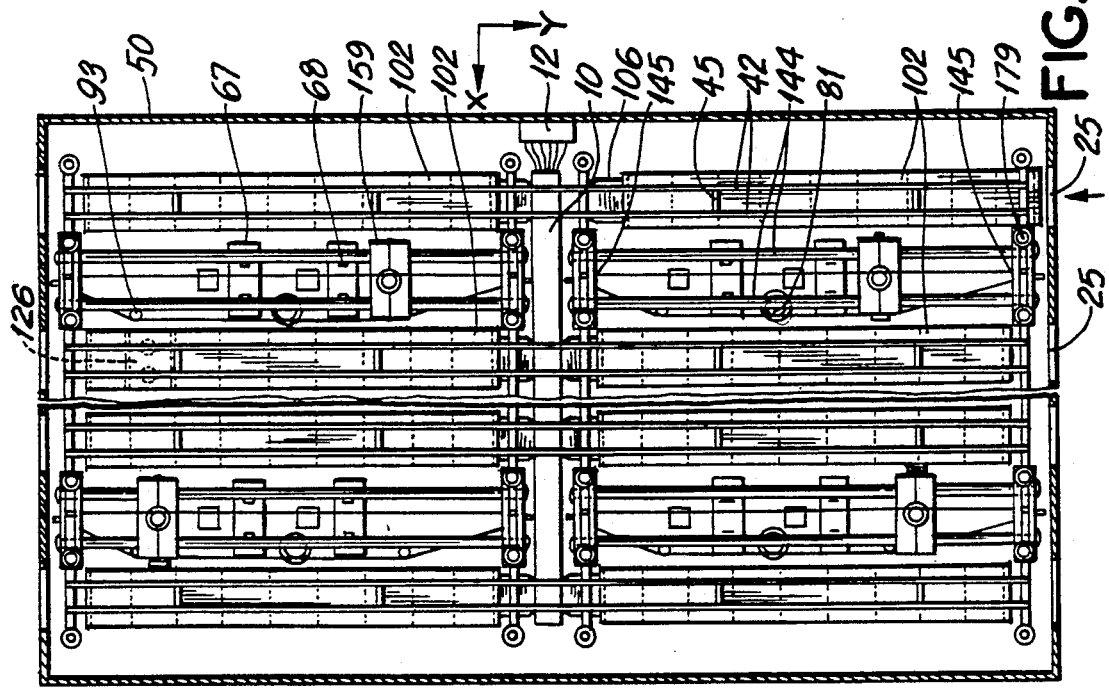

FIG. 1B. A plan view of an ultra large digital/analog memory storage having at least eight sets of memory packs with one memory pack is entering into the apparatus.

Figure 2:
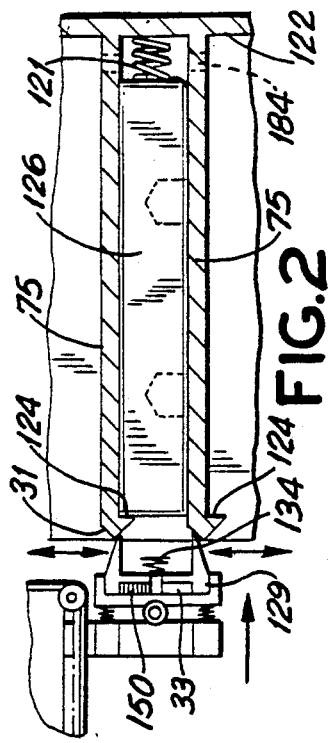

FIG. 2. Shows the end effector (gripper) trying to pick up a tape from a tape bin of the tape cabinet (looking along the Y-axis).

Figure 3:
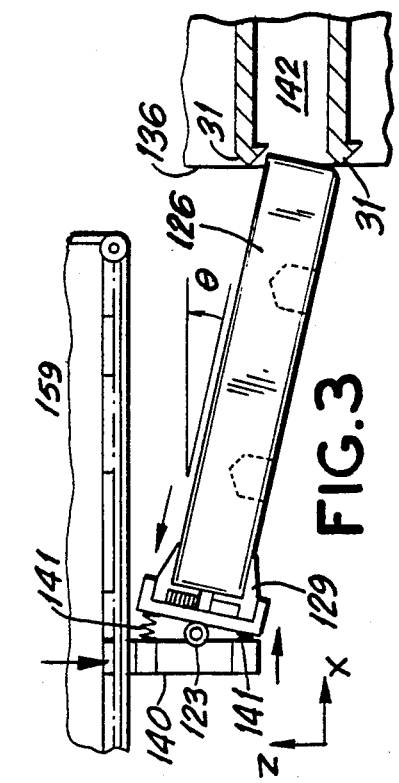

FIG. 3. Shows the gripper trying to do the azimuth insertion of the cassette (looking along the Y-axis).

Figure 4:
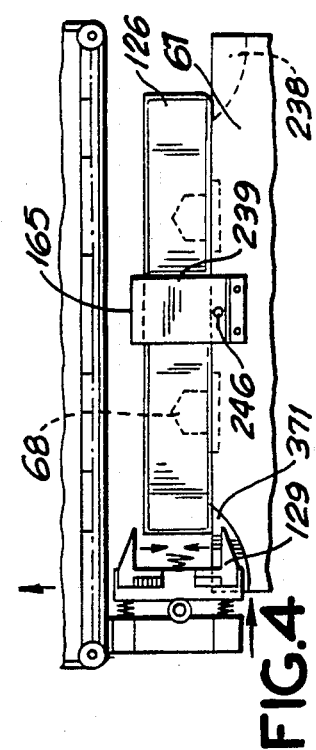

FIG. 4. Shows the gripper trying to pick up a cassette from the tape driver (looking along the Y-axis).

Figure 5:
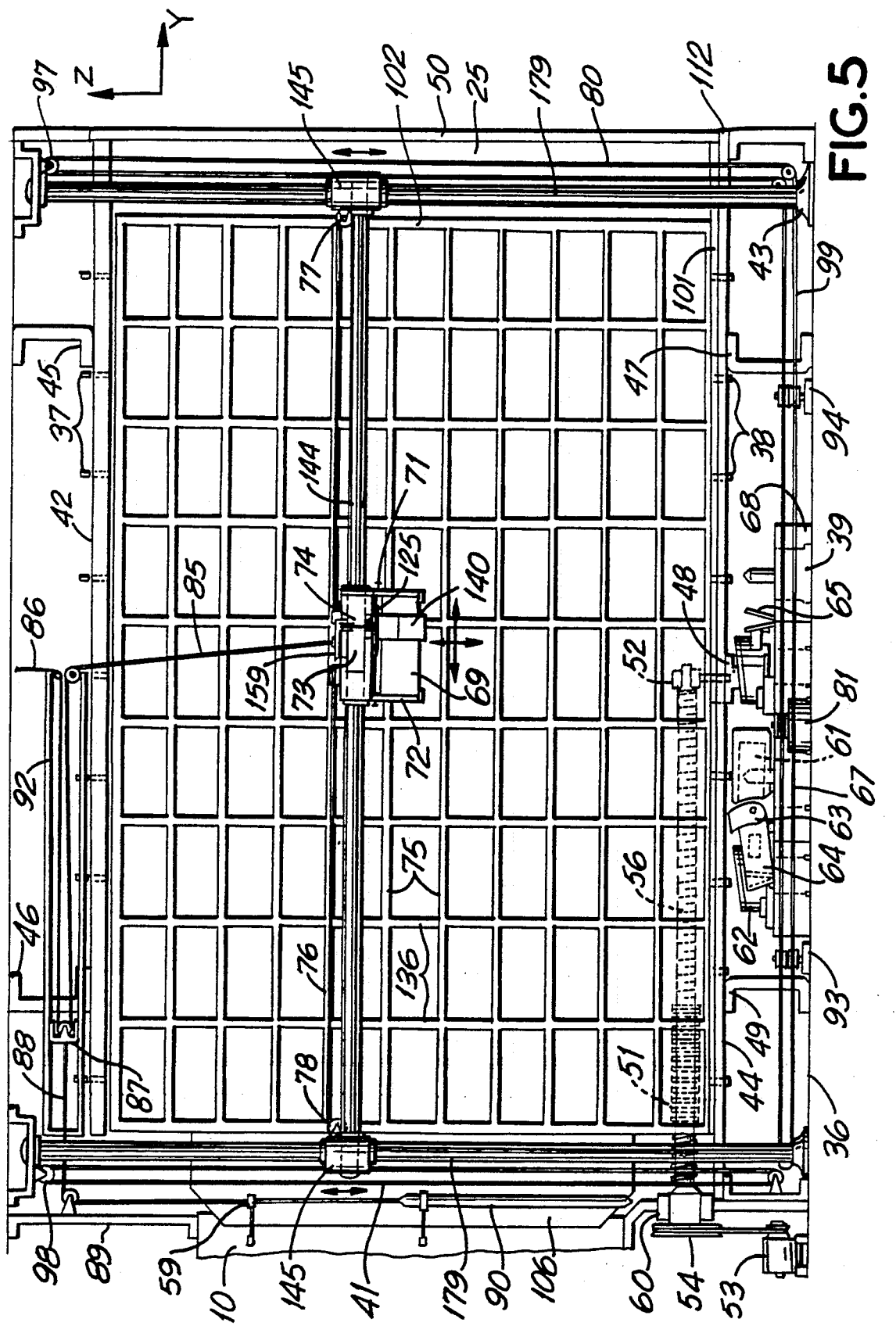

FIG. 5. A Y-Z cross section view of the apparatus to show a mixed media memory pack behind its tape transporter and two tape players and in front of its mounting means.

Figure 6:
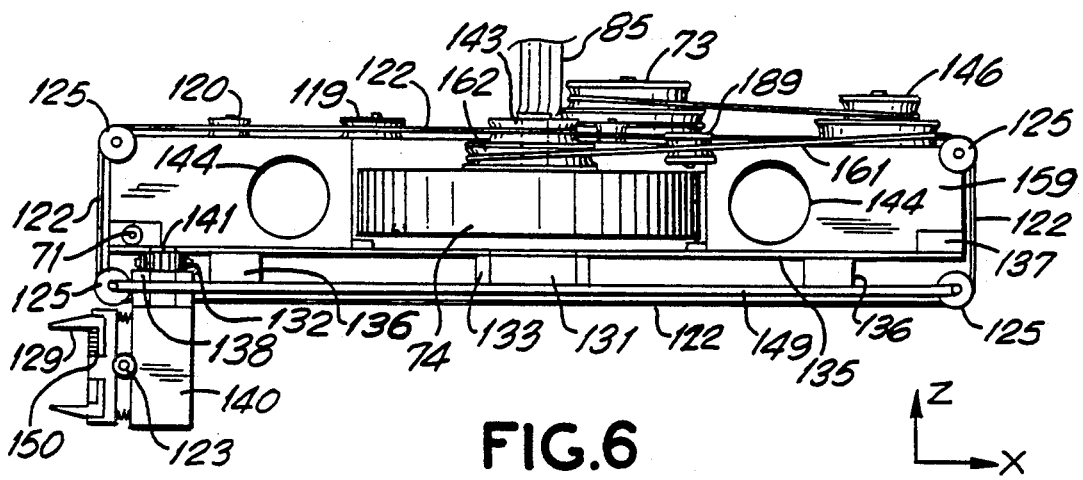

FIG. 6. A X-Z cross section view of the tape carrier with gripper to show its moving mechanism.

Figure 7:
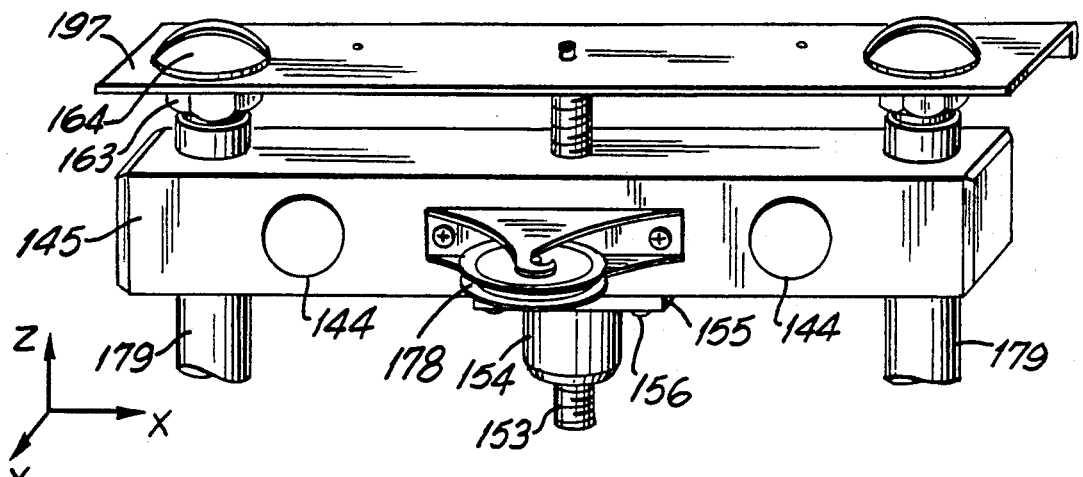

FIG. 7. A perspective view of a vertical movement means of the transporter using long screw engagable with nut.

Figure 8:
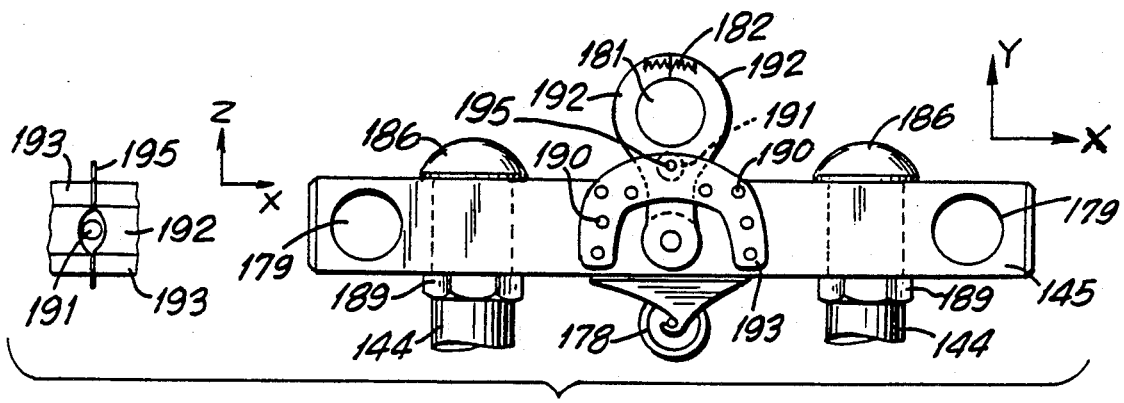

FIG. 8. A X-Y cross section view of the vertical pole brake assembly of the transporter.

FIG. 9. A Y-Z cross section view of the gripper body.

FIG. 10. A X-Z cross section view of the gripper top slidable on a guide plate to show the shuttle movement and direction change mechanism of the gripper.

FIG. 11. The perspective and cut away view of the digital/analog computer mounting a digital/analog pack.

FIG. 12. A X-Z cross section view of a digital/analog pack mounting mechanism.

Figure 13:
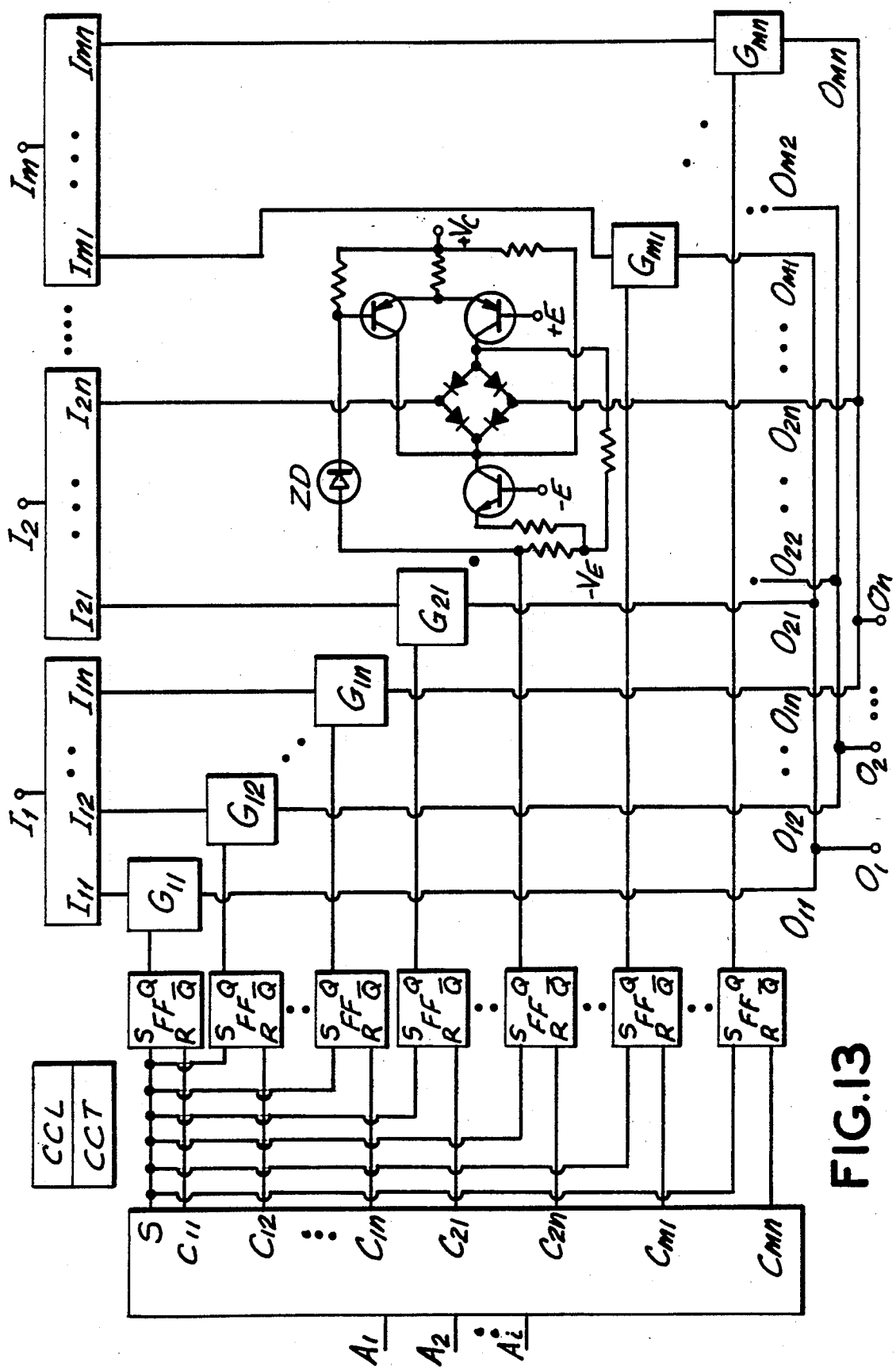

FIG. 13. The analog communication controller (ACC) diagram.

FIG. 14. Tri-reel cassette, a plan view.

FIG. 15A. The helical scan video head drum with dual scan mechanism by a movable head axle.

FIG. 15B. The perspective view of head drum having a large number of heads for high speed reading/writing.

FIG. 15C. The video head speed vector analysis to show how the dual speed reading/writing can be achieved by the head drum with dual scan mechanism and a large number of heads.

Figures 16, 17:
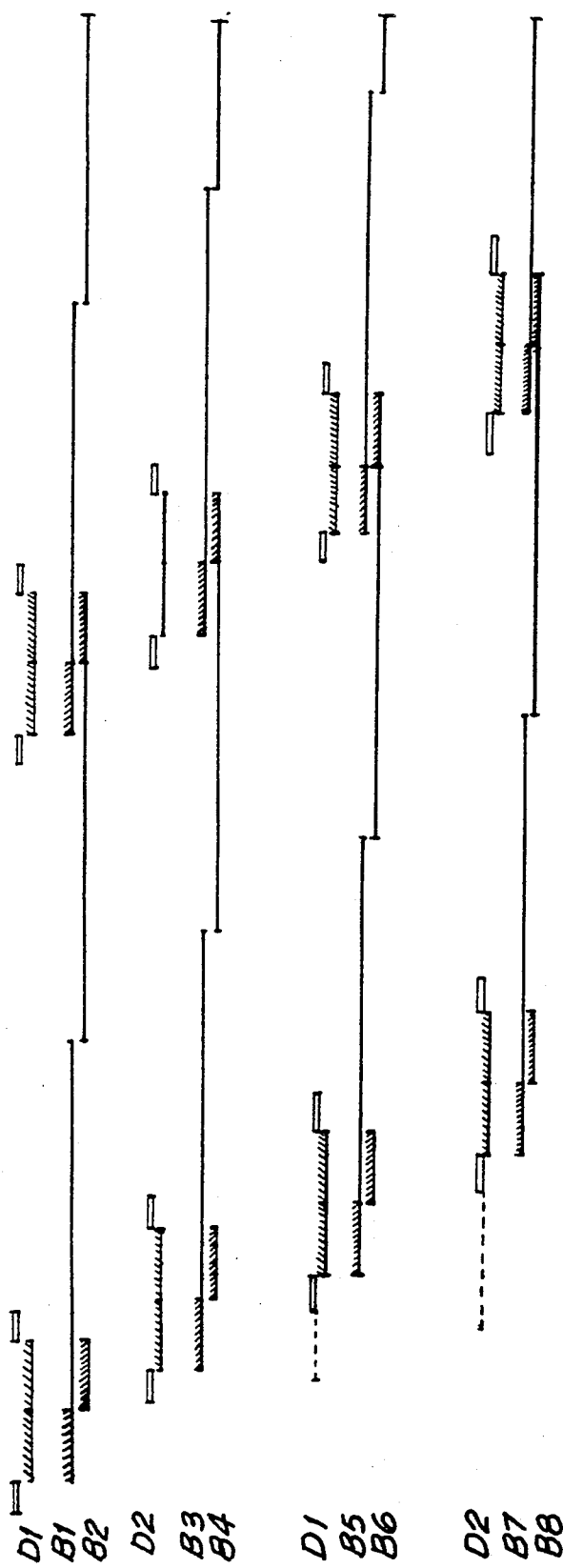

FIG. 16. A scheduling chart to show tasks of four jobs, using the idea of the Analog Resources Scheduling in Tape Operating System.

FIG. 17. An example of the tape format using round trip recording idea in Tape Access Method.

Figure 18:
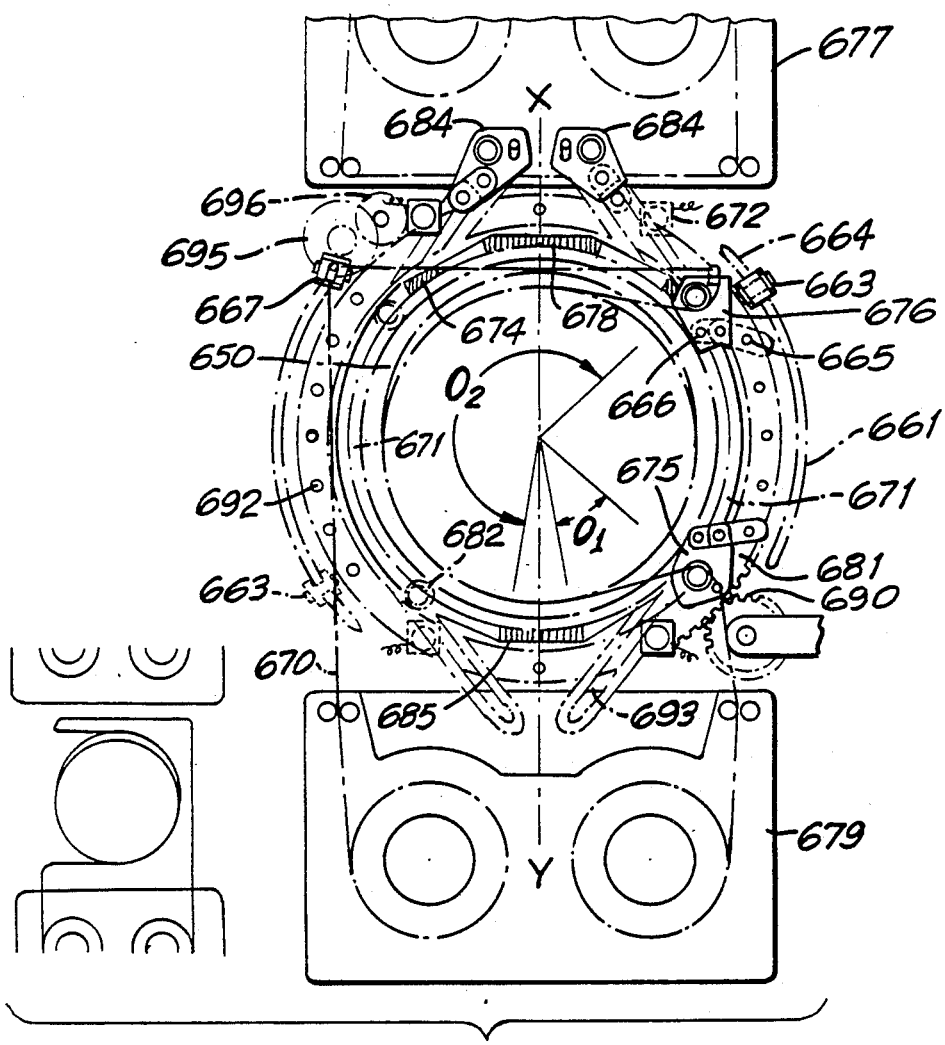

FIG. 18. A pair of video players, each player shared by two cassettes, each player capable of dual read/write speeds and two way tape loading.

Figure 19:
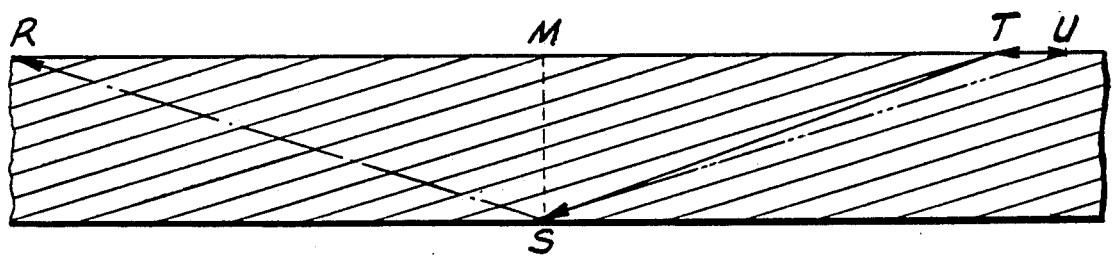

FIG. 19. The video head speed vector analysis for the video players shown on FIG. 18.

Figure 20:
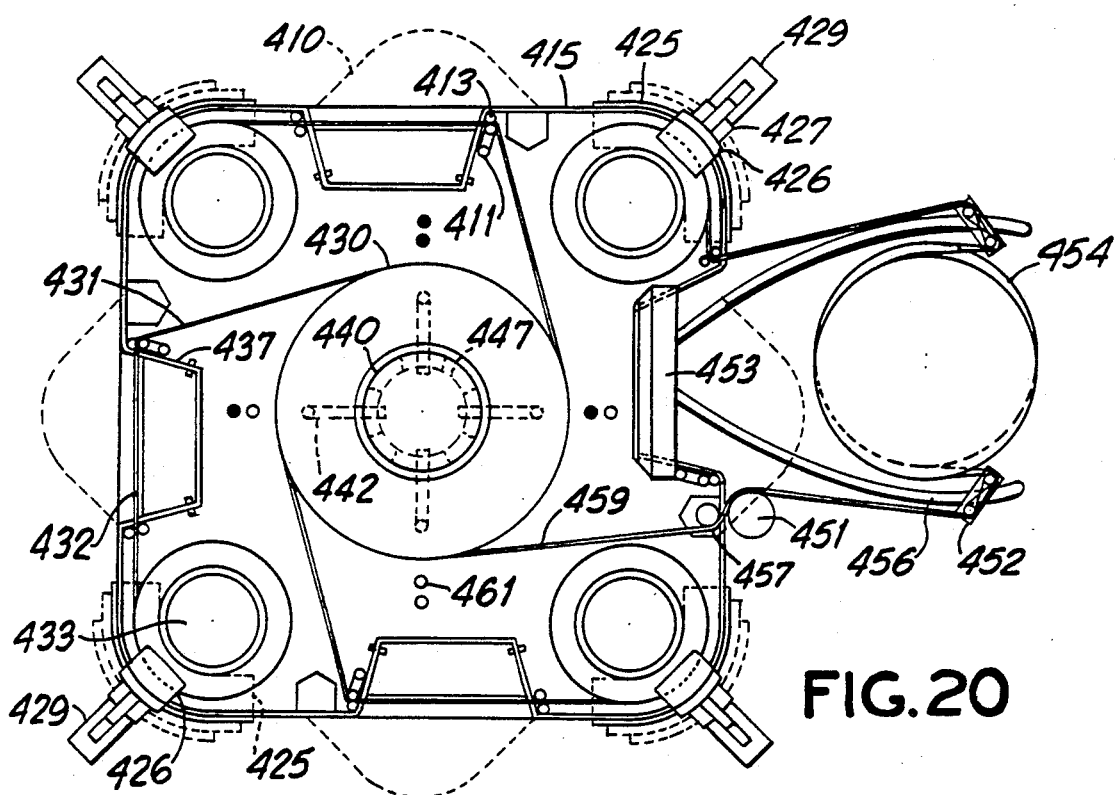

FIG. 20. The quint-reel (four tape) cassette on the cassette player with loading means and a head drum, the top view.

Figure 21A:
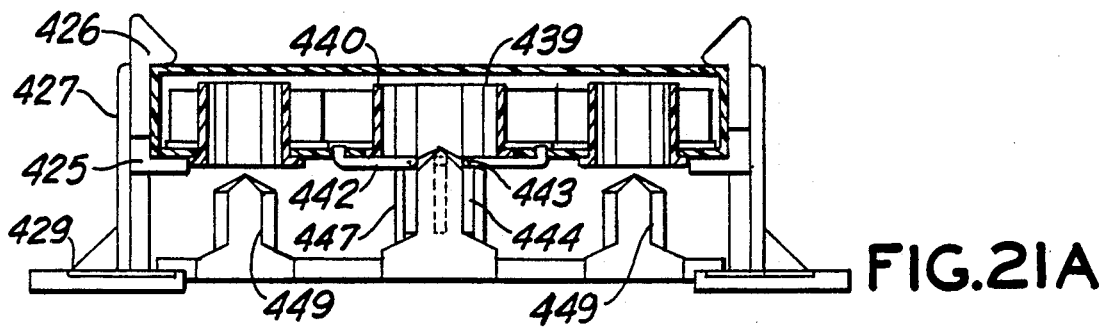

FIG. 21A. The quint-reel cassette on the cassette player, the cross section view of FIG. 20 along the diagonal line with emphasizing on the cassette rotation mechanism.

Figure 21B:
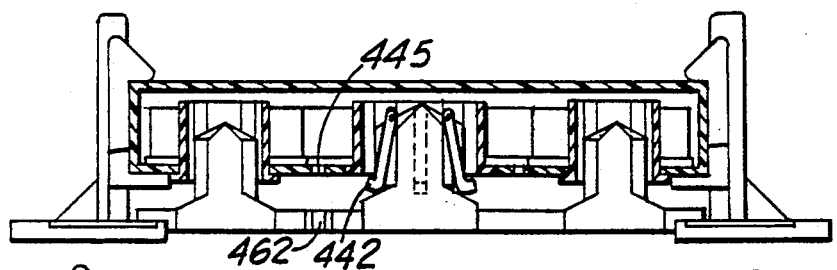

FIG. 21B. The quint-reel cassette player liftable hands are folded into the reel concave when cassette is almost mounted.

Figure 21C:
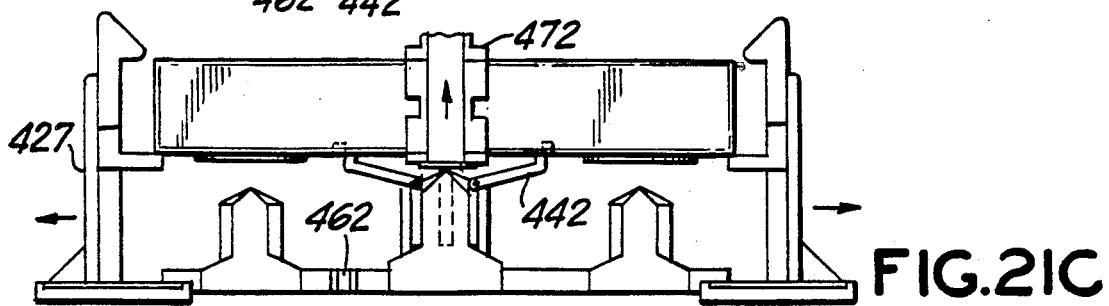

FIG. 21C. The quint-reel cassette is being dismounted by a gripper.

Figure 22:
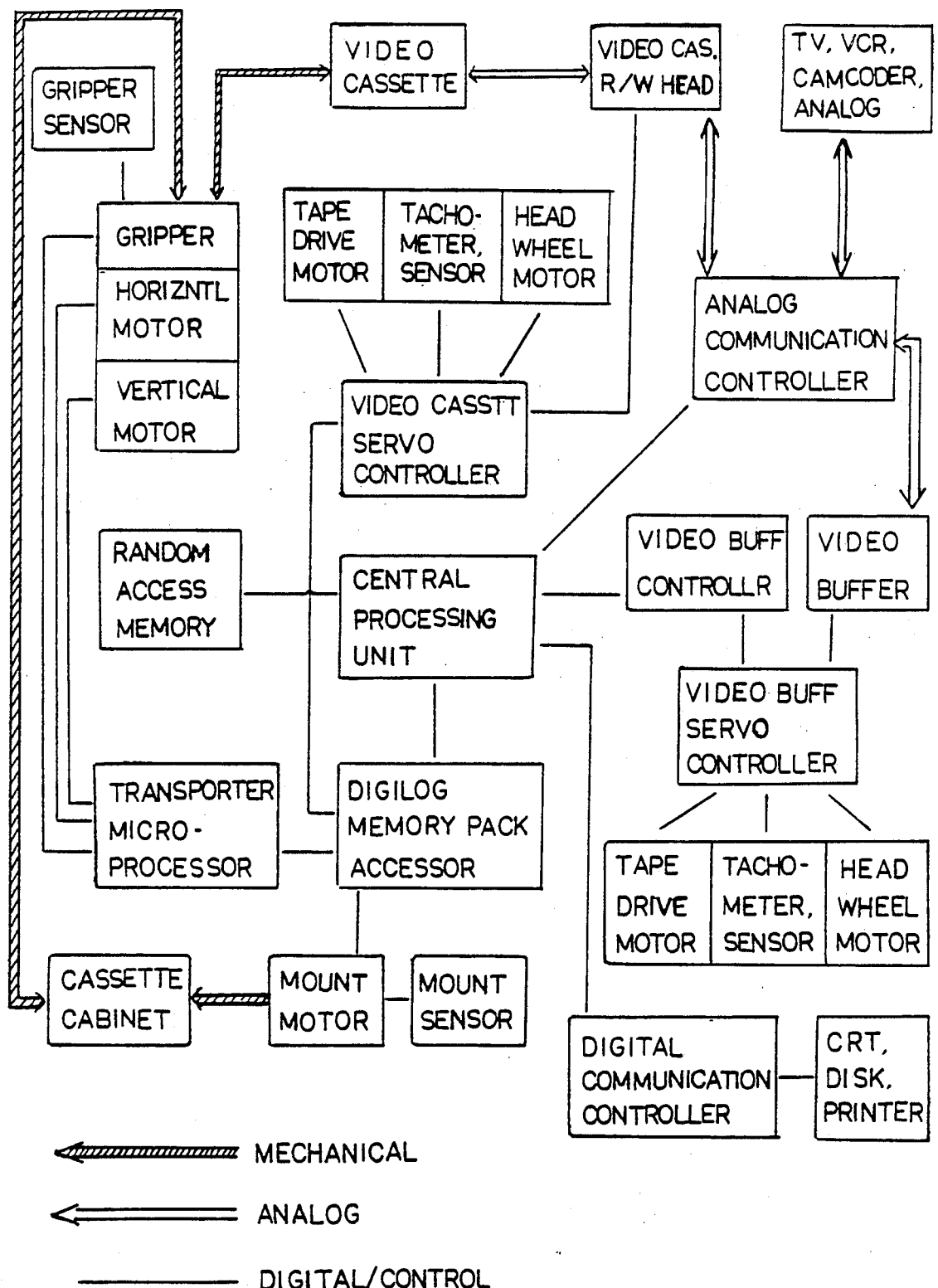

FIG. 22. The system block diagram of a digital-/analog computer to show the major component control mechanisms.

Figure 23:
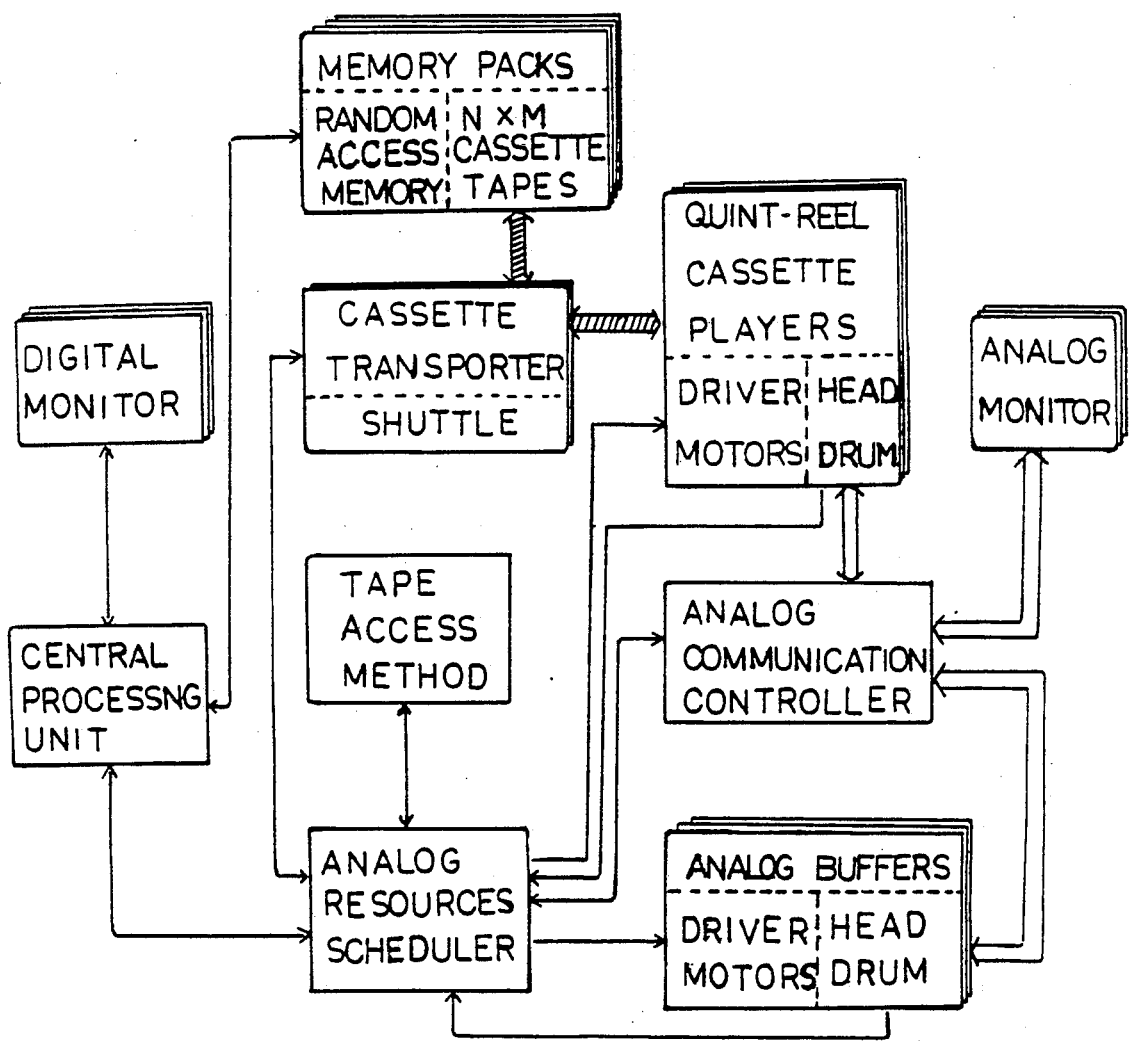

FIG. 23. The system flow diagram of a digital/analog computer to show scheduler and its relation to other components.

Figure 24:
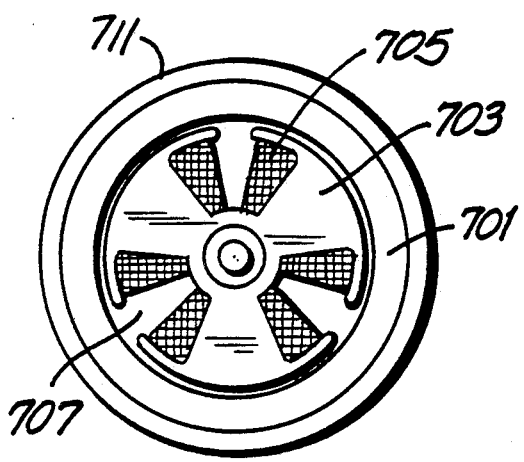

FIG. 24. The cross section view of the asynchronized co-axis multi-shaft (ACMS) motor with one shaft relating four poles.

Figure 24A:
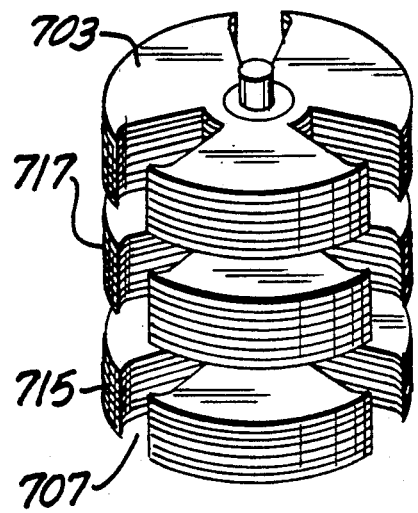

FIG. 24A. The perspective view of the iron-core of ACMS motor without winding on its poles.

Figure 25:
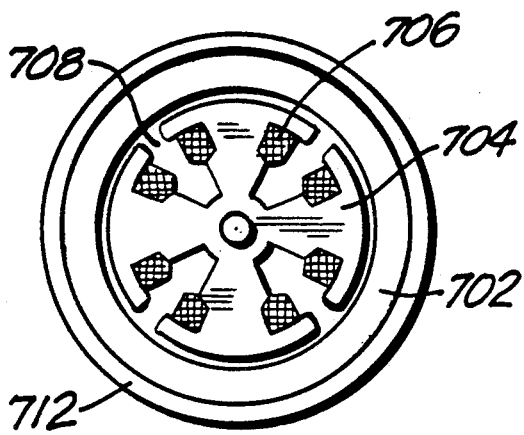
Figure 25A:
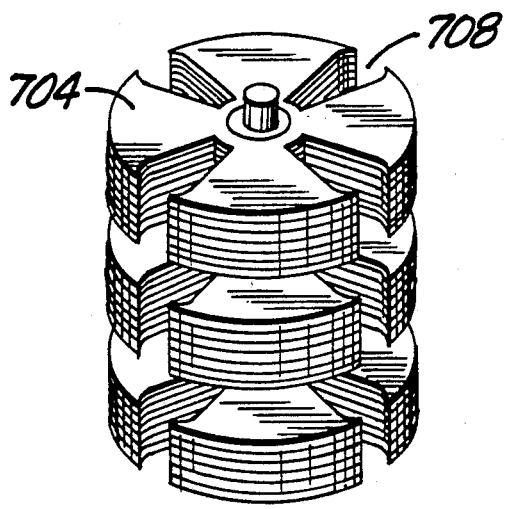

FIG. 25 & 25A, same as FIG. 24 & 24A except the number of poles is 4 instead of 3.

Figure 26:
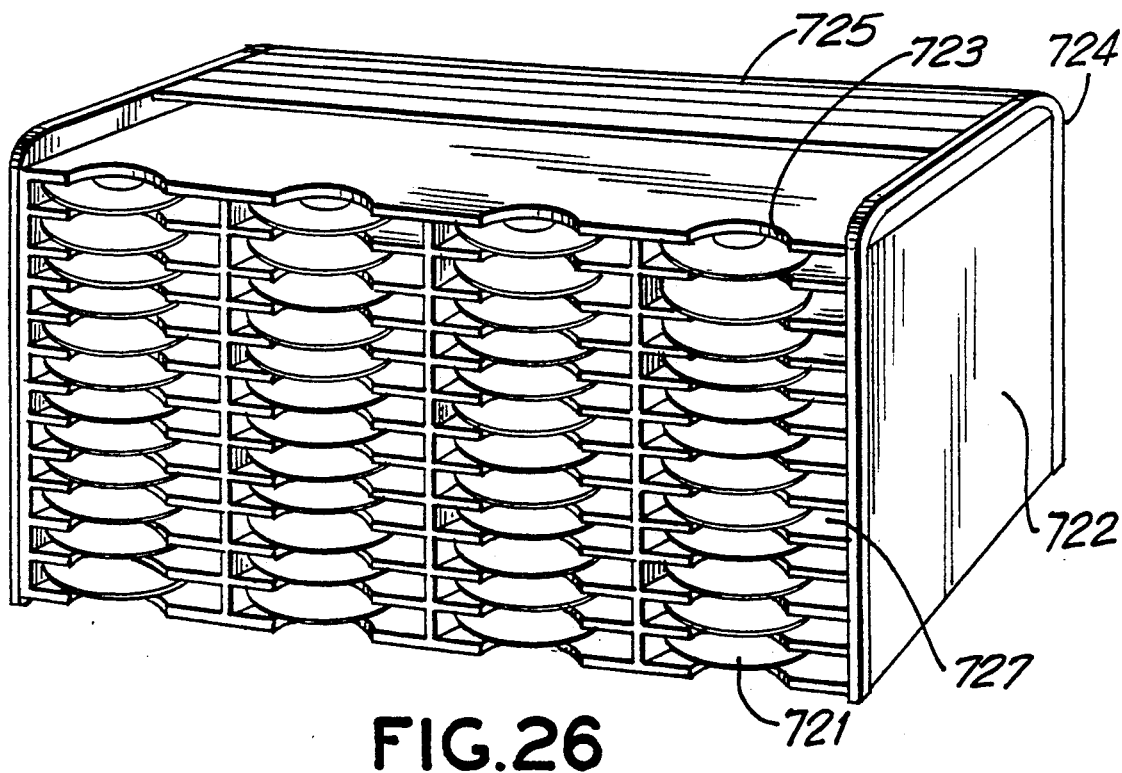

FIG. 26. The perspective view of a disk pack.

Figure 27:
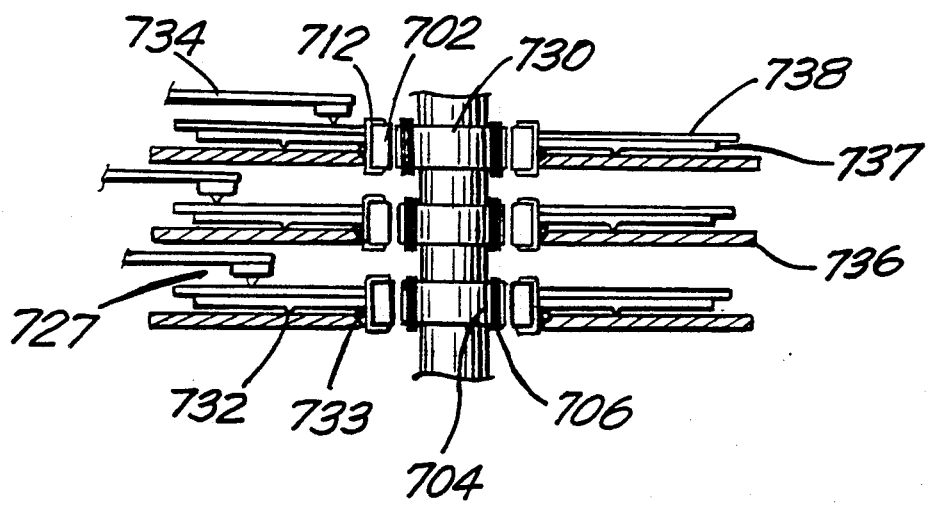

FIG. 27. The cross section view of another type of disk pack which has ACMS motor inside a column of disks.

VI. DETAILED DESCRIPTION OF THE INVENTION

The current invention of information processing system comprises a CPU (central processing unit), a plural number of digital communication controllers, a plural number of analog communication controllers, a house of digital/analog memory storage and an analog tape buffer pool. The digital communication controller interfaces between CPU and digital memory, CRT, printer and other digital terminals. The analog communication controller interfaces between analog terminals and the analog read/write heads. Analog terminals are such as TV, audio receiver, video camera, speaker, microphone, satellite receiver, video cassette recorder, etc.

There are three system block diagrams to be discussed: FIG. 1, FIG. 22 and FIG. 23. FIG. 1 is the simplified version. After the components being discribed, FIG. 22 summarizes the relation of those components. FIG. 23 is the system flow diagram to emphasize the data flow.

SIMPLIFIED BLOCK DIAGRAM OF CERTAIN BASIC COMPONENT (FIG. 1)

FIG. 1 is a simplified block diagram to show basic concept of the apparatus. The digital application data is entered via digital monitor. Under the instructions of software, the central processing unit (CPU) then tried to find the record related to said digital application data by searching the random access memory (RAM) portion of a memory pack. After the record being found, the digital portion of said record from RAM is displayed back to digital monitor. The location data of the analog portion of said record (also from RAM) then is sent to a robot to pick up a cassette (tape or disk) from a N by M cassette matrix. The robot places the selected cassette onto a cassette player. The analog portion of said record is then displaced on analog monitor from cassette player.

MIXED MEDIA MEMORY PACK (FIG. 1A)

FIG. 1A is the perspective view of a mixed media memory pack. The first media is high capacity low cost media such as tapes or disks. The second media is high access speed media such as random access memory. A set 106 of random access memory chips with pins 107 is attached to a cartridge cabinet 102. Said cabinet contains a matrix of N by M cartridges (tape or disk). One of the cartridges 126 is gripped by a robot 140 which has joint 123 to connect a gripper 129.

There are four possible types for said cartridge: digital tape, digital disk, analog tape and analog disk. But only analog tape cartridge (cassette) with helical scan format will be discussed most extensively hereafter. As far as the driving mechanism to achieve the random accessibility is concerned, all other types can be considered as a simplified version of the helical scan tape.

A special type of mixed media memory pack is a disk or a tape with RAM chip on its cartridge. The data in RAM chip expedites the search of records in the disk/tape.

PERSPECTIVE AND PLAN VIEWS OF THE APPARATUS (FIG. 1B, 5, 11)

FIG. 11 is perspective and cut off view of a digital-/analog computer which shows two memory packs 102, one is inside the house 50, the other is about to move through entrance 25. FIG. 1B is the plan view (the top view without the roof of the house) of said computer with at least 8 memory packs 102. Said computer consists of a house 50 with a plural number of entrances 25 to allow digital/analog memory pack 102 to enter along guiding top rail 42 and bottom rail 44. Each memory pack is comprising of a cartridge cabinet 102 and a solid state device 106 such as RAM (random access memory) and a rechargable battery (not shown). All the RAM of memory packs are connected to the memory link (bus) 10 which is connected to the interface panel 12 so that other CPU or computers can be connected. There is a H shaped cartridge transporter 144, 145 with a cartridge shuttle 159 between each pair of memory packs 102. The tape transporter is the device to pick-up, move and load the cartridge 126 (for FIG. 11 it must until pack 102 mounted) from cartridge cabinet 102 to play decks 67, 68.

More detailed side view of the memory pack with its mounting means and the tape transporter is shown in FIG. 5 which is the cross section view of FIG. 11 along the plane Y-Z.

TAPE CARTRIDGE TRANSPORTER (FIG. 1B, 5, 6, 11)

In FIG. 5, the tape 69 to be processed was picked up by the mechanic gripper (robot) 140 of the transporter then moved to on of the available decks 67. There are two stepping motors, one 81 on the chassis 36 controls the vertical movement (Z axis) of the blocks 145; the other 73 controls the horizontal (Y axis) and the gripper body 140 movement. The shuttle is penetrated through by two paralleled horizontal bars 144. (Also reference to FIG. 6 for the shuttle detailed side view) Those bars 144 intersect a pair of vertical poles 179 at two blocks 145, one at each end. A horizontal belt 76 runs through pulleys 77, 78 to the stepping motor 73. The two carriage blocks 145 will be moved upward or downward depending on the direction of the motor 81 which pulls the vertical belts 41, 80 through the top pulleys 97, 98 and the four bottom pulleys, two on each side. There are two flour double pulleys 93, 94 (also reference to FIG. 1B) needed to change the path of the belt to prevent them from intersecting the playing decks 67, 68.

LIMITED MAIN TAPE PLAYERS FOR EACH PAIR OF MEMORY PACK (FIG. 1B, FIG. 5)

In FIG. 5, on the floor chassis 36 between each pair of memory packs there is a plurality of tape players 67, 68 (play decks). In the processing mode, the left deck has a cassette 61 with lid 63 being lifted and the magnetic tape 64 being pulled out to wrap around the helical scan video read/write head 62. The right deck 68 is idle, the head drum 66, the capstan as well as the inclined and the limiter posts 65 have no tape on them. There are also two play decks 67, 68 in FIG. 1B for each pairs of memory pack 102.

In connection with the configuration of the system, it must be kept in mind that where there has to be physical transport, as the carrying of a cassette to a main player, the physical location of the cassettes being carried to one another is significant and the physical constraints of the system will limit the location of the main players involved and thus limit the number of main players available to a cassette of any pack.

On the other hand there is no significant physical constrain relate to a tape buffer player. Therefore there is no limit number of tape buffer players which will be shared by all packs. The only limit for the number of buffer players is the cost.

Using the tape buffers, high-speed copying techniques, tape access method and anaolg resources scheduler to be described later, the preferred embodiment of this invention enables the number of records being processed concurrently more than the number of tape players for each pack.

MOUNTING MECHANISM OF THE MEMORY PACK (FIG. 2, 5, 11, 12)

The portablilty is important for memory pack. To ship the pack from one place to another is much cheaper than to transmit the data through communication carrier due to the data quantity. Hence mounting/dismounting the pack is normal operation of the system.

There is a roller slide 101 between the cabinet 102 and the bottom track 44 to reduce the friction of movement (also reference to FIG. 11 & FIG. 12) on mounting. When the cabinet is half way entered, the long screw 56 powered by the motor 53 and transmitted by the shaft 54 engages the rack 51 which is fixed on the back of the rear cabinet wall to pull the memory pack in and mate the solid state device RAM 106 to the memory link (bus) 10. The long screw 56 is properly bearinged at 52.

In FIG. 5, there is an array of lights 37 at top rail 42 and near the rear part of the cabinet. The light beam will pass through the holes (184 also in FIG. 2 and FIG.

12) of each tape shelf 75 to energize the solar cells 38 in FIG. 5 at the bottom rail 44 near the rear part of the cabinet. All the solar cells 38 must be energized to confirm the mounting is correctly finished.

THE AUTOMATIC BELT FOLDER (FIG. 5)

There is an electrical cable or belt 85 to connect power and data from the source (not shown) to the shuttle and the gripper. In order to prevent the belt 85 being tangled or jammed with the shuttle when the shuttle is moving toward the top and center of the cabinet, a belt folder 92 is needed. A slidable pulley 87 is inside the long housing 92 to pull the electric belt 85 by a weight 90. The fixture 59 will prevent the weight 90 and its belt 88 from moving sideway.

THE CASSETTE SHUTTLE AND ITS OPERATIONS (FIG. 2, 3, 4)

In FIG. 2 to 4 more detailed description about the shuttle, the gripper and their interaction with cassette. In FIG. 2, there is one spring 121 on the rear wall 122 of each cabinet bin. There is a tip 31 with lug 124 on the front edge of each shelf 75. The pointy tips 31 will guide the cassette coming into the bin. Between the lug 124 and the spring 121 the tape cassette 126 will be latched in the bin. When the mechanic gripper 129 is to pick up the cassette tape 126, it takes the following steps:

1. position the gripper near the entrance of the bin
2. energize the solenoid 150 to act with the permanent magnet 33 to reduce the opening of the gripper 129
3. pushes the gripper a little forward to touch the tip 31 of the shelf
4. is reversed energized the solenoid 150 to let the gripper 129 tips push the shelf tips 31 outward so the cassette 126 can be pushed out by the spring 121
5. energized the solenoid again to grip the cassette when it touches the sensor 134

ACCURATE AND SPEEDY INSERTION OF A TAPE CASSETTE (FIG. 3)

The insertion is more difficult than the pick up since the size of the cassette is the same as the size of the bin entrance. When the cassette failed to be inserted, it may be because Z axis is in error or Y axis is in error or both. This makes it very difficult to correct the error without any sensors on the tip of side walls 136, tip 31 of shelf 75, or the front of the cassette 126.

In FIG. 3 the method of the azimuth insertion is demonstrated. This method has the advantage of no sensor being needed. Due to the weight of the cassette 126 and the joint 123, there is an angle between cassette and horizontal line. The cassette weight is pushing the bottom spring 141 down to create a angle @ between cassette and the horizontal line. Then the following tasks will be executed:

1. move the gripper body 140 to the position so that the cassette front is at the entrance of the bin with top cassette front edge slightly lower than top shelf tip 31 of the bin 142, and the left edge is a bit lefter than the left wall 136 of the bin 142,
2. push the body 140 a bit forward so the top edge of the cassette will press against the front edge of the wall 136,
3. move the shuttle 159 a little rightward (toward the reader in FIG. 3) so that the cassette will pass the wall 136 to enter into the bin 142, i.e. find the exact Y coordinate. This can be done even with error on the Z coordinate as shown in FIG. 3,
4. push the body 140 forward, lower the shuttle 159 until the angle @ diminished (The exact Z coordinate is found),
5. the gripper 129 move forward further, release the cassette, move backward, close the jaw more and use the tip to push the cassette all the way in until pass the end sensor light tunnel 184. The jaw has to be outside of the cassette so the lug 124 can latch the cassette.

THE CASSETTE PLAYER MOUNTING MECHANISM (FIG. 4)

In FIG. 4 the cassette 126 is on the play deck 67 latched by the tip 165 of the anchor 239 which has similar function as tip 31 of the shelf 75 in FIG. 2 or 3. There is grooved slope on the middle of each side 371, 238 of the deck to allow the gripper 129 to pick up the cassette from either side of the deck to move to the other side of cabinet. When the gripper 129 is ready to pick the cassette 126 up, the solenoid 246 must be energized to push the tip 165 outward to unlatch the cassette 126

DETAILED MECHANISM OF THE TAPE SHUTTLE (FIG. 6, 9, 10)

FIG. 6 is the detail side view of the shuttle. The stepping motor 74 is mounted near the center between two horizontal bars 144. The primary shaft has two pulleys 143, 162 and the belts 122, 161 to transfer torque. When the control pulley 189 moves to tighten the belt 161 the torque of 162 will transfer to the pulley 146 then to the pulley 73 which controls the shuttles horizontal movement. The control pulley 119 on the other hand can be moved to tighten the belt 122 tension to transfer the torque from 143 through pulleys 125 to the gripper body 140.

There is a plate 149 attached to the shuttle bottom by the blocks 136. Reference to FIG. 9 for the vertical cross section view of the gripper body and FIG. 10 for the top view of the plate with gripper's direction change mechanism. This plate 149 supports the collar 138 and guides the body 140 movement. When the rack 131 in the box 133 moves outward to engage the gear 132, it will force the body 140 to rotate. Since the hatch 141 is guided by rail 135 except at the middle section where the rack 131 is allowed to engaged to the gear 132, the gripper body 140 is not rotatable at non middle section. The ring on 130 (not shown) connects the belt 122 will allow the body 140 to rotate without interfering X axis movement. In FIG. 9 the collar 138 is a separable part from the body 140, the neck 130 and the gear 141. In FIG. 10, the center point of the hatch 141 is the electric brush to contact the copper strip (not shown) to transmit the electric current from the source in the shuttle to the gripper solenoids 150. Since the current may be reversed when the body is rotated, the gripper function will be interrupted. This causes no problem due to the fact that gripper is idle when its body is rotating. The only reason the body 140 to be rotated is that the gripper can pick up tape cassettes from the tape cabinets of either side (FIG. 1).

THE VERTICAL BRAKE FOR THE TAPE TRANSPORTER (FIG. 8)

In FIG. 8 (top view) a brake 192 may be needed to hold the block 145 to resist the gravity when rests. A third vertical pole 181 is needed for brake since two other vertical poles 179 is lubricated. The brake 192 is sandwiched by the horse shoe 193 which are screwed 190 to the block 145. When the belt 195 (also reference to left figure) pulls upward or downward, the ball 191 inside the middle of the brake parts 192 will push them apart to release the brake 192. When the belt 195 is rest the spring 182 will force two brake parts 192 to press against pole 181.

SCREW VS. BELT/PULLEY FOR TRANSPORTER (FIG. 7)

For a larger sized transporter, a long screw 153 in FIG. 7 paralleled with the vertical poles 179 engages a pair of nuts 54 being securely held to the block 145 by the fixture 155 and the screws 156. The long screw 153 is powered by a stepper motor (not shown) to push the block 145 up or down. This type of mechanism has higher noise level which may not be acceptable to some audio environment.

FACTORS IMPACT THE RESPONSE TIME

There are three types of waiting time which will slow down the analog processing. The first type is the time needed to transport the cassette which is about several seconds. The second type is the time needed to rewind or search the record which may take up to several minutes. The third type is the waiting time for releasing a cassette or player currently being used by other user. For example, the cassette has two records: A is 115 minutes, B is 5 minutes. Two minutes after record A is being processed by one user, record B is being requested by another user. Record B has to wait 113 minutes plus rewind or search time. Therefore, techniques are needed to reduced waiting time of type two and three. Tape Access Method (TAM), Tape Buffer Pool and Fast Copying to be introduced later are for this purpose.

TAPE ACCESS METHOD (TAM) - RECORD SEGMENTATION AND INTERLEAVING

As described in last paragragh, TAM is needed to reduced the response time to make random access of the analog record possible. With TAM, each record is divided into several segments. The first segment is the shortest segment and called header segment. The tape is also divided into several sections. Each section contains a plural number of segments from different records. The first section of the tape contains only the first segment of every record. The second section contains only the second segment of every record, etc. Since records have different lengths, the first section of the tape has the most number of segments, the last section has the least number of segments.

TAPE ACCESS METHOD - ROUND TRIP RECORDING (FIG. 17)

Since all records start at the first section, to keep tape position at the first section is important. This means that after the end segment of the record being processed, the tape has to be rewound. This will take the resources such as tape player (driver) and impact the performance. There is a way to avoid this lengthy end rewind. That is "round trip recording": the first half is recorded in one direction and the second half is recorded in the other direction (or return direction). To implement this on section format mentioned before, each section is divided into two parts: positive and negative. They are in opposite directions.

There is another way to further reducing the first section length: divide the tape into two equal parts, each part has format as the mirror image of the other and the beginning of the record is at the middle of the tape. Each part has its own sections. Therefore, each section (especially the first section) has half the length otherwise. Keeping the tape position near the middle of the tape, which is the beginning of each record, will increase the rewind/search speed. The tape speed of half fulled reel is faster than those of empty reel for the same angular speed.

FIG. 17 shows a tape of eight records: A, B, C, D on one half and E, F, G, H on the other half. They all start at middle of the tape. The first half (A, B, C, D) has the format 44322 (the first section has 4 record segments, second has 4, third has 3, fourth has 2 and fifth has 2), the second half has the format 4332111. The longest record is F. The processing sequence for F is f1, f2, f3, f4, f5, f5−, f4−, f3−, f2−, f1−. The shortest one is H which has h1, h1− only. The first half tape has 5 sections. Section I has 1+, 1−; section II has 2+ and 2−; section III has 3+ and 3−; etc. Record A will be processed by the sequence: a1, a2, a3, a4, a5, a4−, a3−, a2−, a1−. The positive segments will be processed from one direction say, left to right, and negative segments will be processed from the other way, right to left. Record A will reverse its direction at end of a5. The maximum end rewind needed for an record to the beginning of the tape is less than section I.

Considering the efficiency of the reocrd retrieval, the important time to be considered is not only the average accessing time but also the maximum accessing time. The advantage of the round trip tape access method is that both average and maximum access time will be minimized.

Another advantages of this round trip TAM is that no need of compress the tape when records are delete. When all blank spaces exhausted, the new record can write on the deleted record of the same number of segments. Even if no such deleted record can be found, the combination of several records from same cassette is acceptable too, if the total number of segments is the same or greater than the number of segments to be written. No extra access time for the new record is needed. This is because there will be no extra rewinding/search time for the next segment even that segment is originally from a different deleted record. With quint-reel cassette tape introduced later, the record combination can cross tape boundary. This makes combination much easier to find since each cassette has four tapes.

Again another advantages of this TAM is that the number óf concurrent users is much larger than the number of main tape players. This is very important since the latter is very limited as explained before. When record segments are fast copied to buffer, the main tape player can be freed for other user even the first user hasn't finished his record yet. The record is displayed from buffer after fast copied.

Since the length of the first section determines the maximum searching time for a record to be processed, it is important to reduce the length of the first section. There are two ways to reduce its length: reduce the length of the first segment and reduce the number of records. There is a limit that how much the first segment length is able to be reduced as mentioned before. But reducing the number of the records means reducing the utilization rate of the tape capacity. However another rule for TAM can overcome those problems: combining the short records with long records in all tapes to achieve both high utilization rate and low number of records in each tape.

A record can cross more than one tape. The remaining record in the other tape should be treated as a new record. It will go through the header section to the second, etc.

Using TAM, high speed read/write head and the multi-reel cassette to be described later it is possible to randomly access any record in the huge tape library within a few second.

PRIMARY FUNCTIONS OF TAPE ACCESS METHOD

The functions which TAM provides:

format blank tapes, mix short records with long records record allocation, formular to locate existing record segments assign space, location for new record or segment to be added space management statistics, such as free/deleted records or segments, percentage usage of each pack, etc.

data management statistics, such as frequency of a record, segment or tape of each pack being processed reorganize/reformat fuction if necessary

THE DUAL SPEED, BI-DIRECTIONAL TAPE BUFFER

In order to have continuous and efficient play for each record, the tape buffer is needed. The tape buffer contains a pool of high quality short tape cartridges/cassette permanently mounted on the tape players of dual (high/normal) speed head drum of bidirectional (forward/backward) capability. The difference between tape buffer player and tape player at memory pack is minimum. Nevertheless, there are still some differences:

The buffer pool can be located at any place inside or out side the apparatus, but the main cassette players must be inside the apparatus and near the memory pack to minimize the access time.

The dual speed and bi-directional head drum are required for buffer, but is optional for main (non buffer) player The number of main tape players of each pack is much less due to physical constraints of the system.

The n-th segment of a TAM formatted tape will first be high speed copied to buffer then displayed from buffer. At mean time the n+1-th segment will be fast searched. Once the n+1-th segment reached, it will be fast copied to buffer. Therefore, if the display time needed of the n-th segment is equal to or longer than the search time plus the copy time of the n+1-th segment, continuous record play is possible even the n-th and n+1-th segment are not connected. If the segment is reversed copied on the tape, the head drum can fast backward copied to buffer. Then buffer doesn't have to be rewound before being displayed.

Using this TAM, the maximum time needed to search any record in the tape is the time needed to fast copy the first section into the buffer, assuming that the tape position is at beginning (i.e. tape is fully rewinded). If the header section is only 1% of total tape length, the maximum search time for any record is about 1% of the maximum search time needed for the sequential tape method, assuming the search speed is constant and equal to fast copy speed. The sequential tape method is the conventional way to store records continuously one after another.

HIGH SPEED COPYING TECHNIQUES (FIG. 15A, 15B, 15C)

As mentioned before, high speed copying is needed in Tape Access Method. FIG. 15A, FIG. 15B, FIG. 15C show the idea to implement high speed helical scan signal copying techniques. In FIG. 15C:

Vector RS is the head drum speed on high speed copying mode.

Vector RT is the tape speed on high speed copying mode.

Vector UT is the tape speed on regular read/write speed mode.

Vector SU is the head travel speed at regular speed mode.

For 180 deg. wrapping, the number of tracks covered by RS is the half of the number of the heads on the drum 621 in FIG. 15B. The inner drum 630 in FIG. 15B has a cylinder of slip rings 646 which contact the brushes 645 of the heads. For 180 degree wrapping, it needs two heads to complete one revolution. Therefore, there are two heads on each slip ring.

Notice that the number of heads 647 on FIG. 15B is more than the number of tracks crossed by RS on FIG. 15C. This is because, in FIG. 15A, the tape 623 can not cover half of the heads on drum 627 on high speed position. The half of the number of heads should be greater than the number of the tracks the tape actually being crossed by the drum. Therefore, no loss of any signal is possible during high speed copying. On normal speed mode, only two heads with 180 degree separation are alternative on, others are always off. FIG. 15A shows the dual helical angles the head drum can have. The axle AB is for normal read/write mode. The axle CD is for high speed read/write mode. Only the outer drum 621 is running and driven by pulley 629 when the head is on. The inner drum 630 and axle 639 is always stationary. The both ends A, B of axle 639 are square necked to help it locked onto the frame 633 and 636 by latches 637, 638. The cable 624 will connect the heads to read/write circuit (not shown) of the system.

The axle 639 is framed by half spherical ceiling 633 (only rare half) with opening between A and C. The half spherical 633 is fixed on the chassis by screw 641. When the drum changes the mode, the axle 639 will be turned by both 635 and 636. At end of the turn, it will be latched by 637 and 638. The tape 623 is wrapping half of the drum 621 between two pairs of limit and incline poles 620. The high speed copying drum must have the following numbers (integers) to be equal:

1. speed ratio, i.e. high tape speed RT / normal tape speed UT
2. number of active heads in high speed mode drum N2 / number of active heads in normal speed mode drum (2 usually)
3. the number of tracks ($t_1, t_2, \ldots, t_m$) each head drum can cover on each high speed mode scan In addition, the vector addition of the high tape speed RT and the head speed RS must be equal the vector addition of normal tape speed UT and the normal head speed SU.

Be aware of that the head drum speed RS of high speed mode may not be higher than the head drum speed SU of normal head mode. The application of this high speed helical scan head drum can not only be used in video tape, but also in digital tape.

There is a tape operation system (TOS), to be explained later, to schedule those tasks in such way that the utilization rate of both transporter and tape player (deck) can be maximized on the expected processing environment. If the large number of users to use the same digital/analog pack is important, increasing the number of play decks is necessary. But the compactness and location physical constrains may limit the choices. One of the choices may be twin decks shown on FIG. 18.

TWIN DECK PLAYER WITH DUAL SPEED HEAD DRUM (FIG. 18, 19)

In FIG. 18, deck 677 and deck 679 share one head drum 650 and tape loading/wrapping mechanism. The wrapping mechanism includes a set of eye shaped rail tracks 671, 693 and tracking controls 678, 685. When the solenoid 685 is on, the track 671 is connected to track 693. When the solenoid 678 is off, the bar 674 will disconnect the twin tail tracks from the circular track 671. The tape wrapping (loading) mechanism is achieved by a loading gear 690 driving a pair of overlapped ring gears 681 (bottom one is not shown). Said ring gears are fixed by four poles 682. The bottom and top ring gears has speed ratio of $O_2/O_1$. $O_1$ is the angular movement of the loading pole set 675. $O_2$ is another angular movement of the loading pole set 676. The ratio is achieved by a set of the reversal gear 695 and the speed reduction gear 696 meshes both the top and bottom ring gears 681. The loading pole set 676 has a rod 666 inserted into the rail 671 and a stub 665 inserted to one 665 of the holes 692 on the ring gear 681. The cassette 677 also has two loading pole sets 684. Since the solenoids 672 unplug the stub of permanent magnet on the loading pole set from the hole of the ring gear, there will be no movement for loading pole sets 684 when ring gears are rotating.

There is a pair of auxiliary movable and rotatable guide poles 663. When the loading pole set 676 passed the 90 degree to wrap the drum 650, the movable rotatable pole 663 first rising to pick up the tape then move to the end of the rail 667 and stay there to set the tape path to prevent the tape 670 from touching the drum 650. Many other components such as tension control arm, capstan, erasing heads which are irrelevant to the tape loading mechanism are not shown in FIG. 18.

This is also a better way to implement high/normal speed drum without turning the axle. FIG. 18 and FIG. 19 show how this can be done. The head drum 650 is tilt (slopping) along the line XY. (The conventional drum is tilt along the line perpendicular to XY). In FIG. 18 the tape 670 being wrapped around the left half of the head drum 650. The smaller figure on the left of FIG. 18 showed the tape wrapped around the right half of the head drum. If the left wrapping is for normal speed, then the right wrapping is for high speed, and vise versa. It is not difficult to see that the far side wrapping (very difficult) and the near side wrapping (conventional) pair, unlike the left side wraping and right side wraping pair, can not make two speed modes even with drum slopping direction 90 degree changed.

FIG. 19 shows the video format analysis. The vector SR is the high speed mode head speed, vector TS is the normal speed mode head speed. Vector UT is the normal tape speed, Vector RU is the high speed mode tape speed. The distance between R and M is the same as the distance between M and U. And length RS =length SU. If TU is the same as the track width on the edge of the tape, then the three conditions mentioned earlier for dual speed mode drum are satisfied.

The head gap direction of the high speed head is different from that of normal speed head. Hence, according to the preferred embodiment of this invention, different heads will be used for differnent speeds. The flying erase head is needed for each read/write head. The erase head must cover the same track as that by the write head.

In order to utilize the azimuth effect which is commonly used in video recording to prevent cross talk, the number of heads on FIG. 15B must be even number. If the even number heads use +6 degree, the odd number heads use opposite angle, −6 degree.

HELICAL SCAN TAPE WITHOUT CONTROL/TIME TRACK (FIG, 15C)

FIG. 15C shows the type of helical scan format will be discussed here. This type of format has no additional tracks on the top and bottom edges of the tape for the time and the audio signals. This type of format, known from U.S. Pat. No. 4,317,144 which is primarily designed for audio signal, requires measuring time difference between the zero passages of the signals from two heads scaning upper and lower half of a track. Said time difference for video signal is much smaller than audio signal. Another method is preferred for video signals.

According to the preferred embodiment of this invention, additional head called comparison head is also used for each read/write head. These two heads covered the same track (on correct speed and thread condition) and with opposite azimuth angles. On read mode, after adjusting the delay (if any), compares the outputs from those two heads. If the signals from the comparison head is crispier, one track (delay or advance) adjustment is needed. If outputs from both heads have similar crispness, half track adjustment is needed. If the comparison head output is less crispy, no adjustment is needed. If speed is correct but track adjustment is needed, compare last adjustment, and choose the opposite direction. If no previous adjustment made, choose anyone. If speed and track adjustment is needed ajust the speed first.

For many video formats whose tracks have large slant angle from vertical line, change tape speed has little effect on track adustment. The axial micro movement of head drum is needed to make the track adustments.

Since the color sync burst has the standard 3.58 M Hz signal trailing each horizontal sync (NTSC system), it can be used to test the crispness of those signals from those heads. This method has the advantage of getting the best signal even during adjustment, since during adjustment the crispier signal is available, either from regular head or from comparison head, hence is used. The adjustment doesn't have to wait until whole field (track) being scanned, it can be done only after a few H syncs being scanned.

ADDRESS CODE ON EACH HELICAL SCAN FIELD

There are 30 frames per second, two fields per video frame, 262.5 lines per field for NTSC (a TV standard) system. Lines are separated by horizontal sync (H sync). If one bit of pulse code signal is coded on each H sync, each field can be accurately addressed. Since H sync is detected by its amplitude not frequency, the address code will not impact the sync function.

This addressing method also provides a practical means to address helical scan digital tape. 262 address bits are too many, since the tape physical movement is also used as the approximate address. For example, 16 bits address can provide 65,536 addressible fields which is approximately several hundred inches for most commercially available video formats. This means that 246 syncs are free for other purposes such as parity bits for error detection/correction and others to be explained later. Using address bits, the smallest helical scan data can be processed is one field, or one sixtieth second of video signal.

THE MIX FRAME FORMAT

The mix frame format is a format that the set of the n-th frame of each record is recorded immediately preceding the set of n+1 th frame of each record. Each set may contain slack space for future addition. In TAM (tape access method) words, each segment has only one frame. If the head drum contains 2n fast mode read/-write heads with n being the number of frames in the first few sections, there is no need of FC (fast copy) the fields of those few sections to buffer then displays those fields from buffer. Since some records will be shorter than the others, later sections have less frames than the first few sections. Only in those later sections, buffer is needed. The header section can be directly displayed by the drum of large number of heads in FIG. 15B, therefore further reduces the response time. When display, only i-th frame of each frame set of the high speed tape will be displayed by the corresponding heads. Since high speed search to the first i-th frame takes little or no time, no matter i is 1 or n (2n the number of fast heads), the response time of searching a video record is minimized. But this format is only good for short records. Otherwise, the tape player will be occupied for extensive period. Using this format, the address code on H sync is required to have accurate field search.

BI-DIRECTIONAL READ/WRITE HEAD

Backward read or write is important for update or rewrite a lengthy record. Since record usually is displayed first, then rewrite. The head is at end of record position when it is to be rewrite. The bi-directional head is a head which has the ability to read/write the data in forward and backward directions. Stationary head like audio head can easily be convert to bi-direction by adding erase heads on both preceding and trailing side of the audio head. But helical scan head is much more complex.

If helical scan record is backward recorded, it is not only the field sequence but also the line sequence being reversed. If the head scan from S to T (in FIG. 15C) of a tape, the reversed scan is from T to S.

Only one direction is permitted for display. A direction sign is needed for each field to assure the head is scanning on right direction for display. One bit coded on the first and last H syncs is preferred by this invention. The negative segments in round trip recording (such as a4−, a3−, a2−, a1− in FIG. 17) should have negative direction sign.

According to the preferred embodiment of this invention, tape cassette players such as shown in FIG. 18 and FIG. 20 require forward and backward recording-/reproduction. The tape tension adjustment and capstan must be able to be bi-directional. If this is impossible, the extra device is needed for the reverse direction. Air film between head drum and tape must be properly maintained for both directions.

THE DELIMITERS FOR RECORD, SEGMENT OR SECTION

According to the preferred embodiment of this invention, there is a special signal EOR, EOS etc., marked at each end of the helical scan data units such as record or segment, the unused H syncs mentioned earlier (in address code) can be used to code it. On the last few fields of an unit, one pulse bit will be coded on the first and last two H syncs so that they can be read on both directions. Using the current tape position with the requested record location, the stepping motor controller can easily find the fastest way to get there. When it is near the destination, the speed slows down dramatically without worry about the stepping motor ramping performance. After the tape is loaded (wrapped), the EOR then be read to confirm the beginning/end of record reached and make the micro position adjustment if necessary. EOR must be two way (forward/backward) and variable speed readable (with the help from comparison head mentioned earlier) to save time.

According to the preferred method of this invention, there is another method to further reduce the response time to almost zero. That is to display a few static pictures with or without audio data before the motion pictures (video) record is available. Since static pictures and audio data use much less storage, they can be stored as digital format in RAM.

STORE THE STILL PICTURES

Video tape can also store slides, still pictures or documents. The mix frame format mentioned earlier is ideal for this static nature of the data. A still record may contain many still pictures (include document & text). There is a delimiter EOP on the end field of each picture. Same pictures may be repeated stored to improve quality. Address code on H sync must be used too.

The quality of analog still picture is not as good as the digital picture using editing algorithm. Use software to scan and convert the picture from analog to digital then edit the digital picture may be necessary. All the hardware and software of video helical scan recording techniques discussed before are applicable to digital helical scan recording. The word 'analog' only means its original source. A video record is basically for sequential processing and for display only not for mathematic or logical functions. Therefore those digitized video records, for practical purposes, can still be considered as analog records.

TRI-REEL CASSETTE (FIG. 14)

There is a limit for tape access method (TAM) to be able to increase the random accessibility of tape. According to the preferred embodiment of this invention, a multi-reel multi-tape cartridge/cassette also can increase the random accessibility of tape. The number of reels is always one more than the number of tapes in the multi-reel cassette.

The dimension of tri-reel cassette is not as compact as quint-reel cassette to be discussed later. But the tri-reel cassette player is simpler to implement.

A tri-reel cassette shown in the FIG. 14 has three reels: the left 602, the middle 603 and the right reel 601. There are two tapes in the cassette: the left tape 606 and the right tape 605. The left reel 602 is always synchronized with the right reel 601 so that the middle reel 603 will pick-up or release both tapes simultaneously. The advantage of this tri-reel cassette is that it will double the speed of record search. There is a stirring hand 611 to control which tape will be picked by tape loading poles of wrapping mechanism (not shown). After the cassette is mounted, the twin tape drawing poles are at concave part 612 of the cassette. If the left tape should be picked, the stirring pin of the deck (not shown) will go through the hole 614 to stir the hand 611 to the right. Both tapes will go through twin rollers 609 at the end of the hand 611. The hand 611 is pivotable at 610. The spring 613 helps the hand 611 stay at either left or right end almost all the time.

QUINT REEL CASSETTE AND ITS PLAYER (FIG. 20, 21A, 21B, 21C)

Quint reel cassette is a cassette of four tapes spooled on five reels. The advantages of this cassette are (compare to two reel cassette):

for approximately double the dimension, the memory increase fourfold, for the same memory capacity, the random accessibility increased nearly fourfold, since to rotate the cassette is much faster than to scroll from one to three quarter of the tape, reduce the tape transporter activity, if the next record segment is in the different tape but in the same cassette, no need to return cassette and get another cassette.

FIG. 20 shows the quint reel cassette. There are four satellite reels 433 and a central (mother) reel 430. Those four reels almost always synchronize on operation except on wrapping/unwrapping the tape to the head drum 454. There are four tape lids 432 with the hinges 437. One of the lids will be opened upward like 453 to let tape 459 be drawn out along the guide rail 456 by a pair of movable tape loading poles 452 to make the tape at least half (180 degree) wrap the head drum 454. At same time the pinch roller 451 of the tension adjust arm will move to capstan 457 and let the tape 459 pass in between to control its speed and tension. The tension adjustment is achieved by a spring (not shown) to push the pinch roller 451 slightly around the pole 457 (capstan) of the tacho-meter. There is a tension detector for each tape to detect high tension and make adjustment accordingly. If a tape has an abnormal high tension, the movable post 413 will move to the position 411 then the the speed of the satellite reel gear will be adjusted.

FIG. 21A, FIG. 21B and FIG. 21C show the mounting and rotating mechanism of the quint reel cassette player. They are the cross section side views of the FIG. 20 along the diagonal line. The mounting mechanism includes a gripper with narrow top 426 wide bottom 425 which is slidable up and down along stand 427. The stand 427 itself is slidable horizontally along the rail 429. The rotating mechanism to change the tape to be processed is achieved by four hands 442 each of which is pivot at 443 by a spring (not shown) against vertical hand 444. The vertical hand is fixed on the ditches between the teeth of center reel gear 447 which meshes the gear 439 of the center reel hub 440. The endturn of the hand 442 is inserted into a small hole 445 at bottom of the cassette so that when central reel drive post 447 rotates, the cassette will rotate with it. The reel drive posts 449 of the small reels are a bit shorter than central reel drive post 447 so that when gripper bottom 425 lifts the cassette out of the smaller drive post 449 the hand end-turn can still stay in the hole 445.

The drive post 449 of the four satellite reels are driven by two (bottom and top) ring gears (not shown) and four engagable gears to pass torque from ring gear to the reel gears under drive posts. Those four engagable gears are always engaged with the same ring gear, except when load/unload the tape to/from the head drum. At that time the load/unload reel gear is engaged with one ring gear and the other reel gears are engaged with the other ring gear.

There is a phase detector 462 which is a pair of photo diodes and a light source. There are four pairs of spots 461 on the bottom of the cassette surface. The four different combinations of the black or white spots 461 represent the four different rotation phases to indicate whether the rotation is completed and the right tape is to be processed. At that time the top 426 part of the gripper will push the cassette down which will push the hands 442 down as in the FIG. 21B. When the cassette is picked up by the gripper 472 of the tape shuttle, the mounting stand 427 will move outward to release the cassette as shown in FIG. 21C.

The head drum 454 in FIG. 20 must keep a proper distance from the player to prevent the cassette 410 from hitting the drum when rotating.

TAPE OPERATION SYSTEM (TOS)

In addition to the Tape Access Method (TAM) which provide data and space management, an operating system to maximize the efficiency of the resources and minimize the response/turn-around time is also very important. According to the preferred embodiment of this invention, the Tape Operating System (TOS) has the following functions:

1. multiprocessing the same tape concurrently
2. utilizing the tape buffer, tape copier and other tape facilities most efficiently, i.e. resources management
3. increasing random accessibility of the tape record to minimize the response (waiting) time
4. security and priority checking
5. resource recovering in case of hardware failure.

There are three types of limited resources which will affect the efficiency of the preferred embodiment of the current invention processing:

the tape transporter, only one per digital/analog accessor the tape cassette player, only two to six players per digital/analog accessor the tape buffer pool has to be shared by all digital-/analog accessors.

There are two types of digital/analog jobs: on-line and batch, just like the digital job types. The batch digital/analog jobs are jobs don't need instant response. An example of this type is to generate a few copies of certain records which satisfy certain qualification and print digital information with them. Another example of digital/analog batch job is to create digital/analog database records from digital files and analog tapes. The time ratio of transporter busy vs. player busy is called T/P ratio. The on-line T/P ratio is usually larger than batch T/P ratio because the formal stays in/out the cassette player more frequently in order to minimize the response time. Therefore, a proper mixture of on-line tasks and batch tasks by TOS will improve the efficiency.

The tape buffer can be used to store segments of different records from tapes to be displayed by users as well as to store unformated records to be converted to digital/analog records. Once the segment being displayed the buffer cartridge can be freed and reused. Since the same record can be used by multiple users, how to select a freed cartridge to avoid the same segment in and out the buffer area too frequently and to avoid a segment from staying in the buffer area too long is important. The tape operation system (TOS) is needed to minimize the unnecessary buffer copying activities and maximize the buffer efficiency to support maximum possible users with minimum average waiting time even in the event of a record collision. A record access collision happens when multiple users are interested a cassette at same time (not necessarily same record).

Since the number of cassette tape players (decks) in a digital/analog accessor is small. The maximum number of users can use the tapes in a digital/analog accessor is less than or equal to that number. But with TOS, a cassette tape, after its segment or section(s) being fast copied to the buffer, immediately returns to the cabinet. The cassette player then is freed to process another tape. Since the segment displaying time is much longer than tape transporting plus the segment fast copying time. It is easy to see that the maximum number of users is much larger than the number of cassette tape players.

ANALOG RESOURCES SCHEDULER (FIG. 16)

The other major part of TOS, in addition to TAM, is the Analog Resources Scheduler (ARS). FIG. 16 shows how this interlaced analog resources scheduler of four records is using two cassette decks D1, D2 sharing one transporter (shuttle) and eight buffers $B_1, B_2, \ldots, B_8$. There are four jobs being scheduled in FIG 16. The first job used $D_1, B_1, B_2$. The second job used $D_2, B_3, B_4$. The third job had initial waiting time and used $D_1, B_5, B_6$. The fourth job had more initial waiting time and used $D_2, B_7, B_8$. The symbols on FIG. 16 are described as the following:

GC: shuttle get the cassette from the cabinet
RC: shuttle return the cassette to the cabinet
DB: display record from buffer to terminal/monitor
FC: fast copy from deck to buffer: FCd from deck, FCb to buffer These are the types of tasks to be discussed further. The solid line indicates that the resource is busy. The record fast copying speed is assumed to be five times the record display speed on the FIG. 16. All four jobs have continuous display from buffers. The segment search time to the segment to be fast copied is small and becomes part of FC time. Therefore, it was not shown on FIG. 16.

There are tables maintained in ARS: the job table, the task table, the buffer table and the deck table. The task table consists of GC (ID, tape, deck, Pre1, start, end)

DB (ID, buff, term, Pre1, Pre2, start, end)     (4)

FC (ID, deck, buff, Pre1, start, end)

RC (ID, tape, deck, Pre1, start, end)

where
  ID: the task identification
  tape: the column and row # of a cassette in the cabinet
  buff: the ID of buffer being used
  term: the terminal ID will be displayed
  deck: the ID of deck being used
  Pre1: the prerequisite task's ID
  Pre2: another prerequisite task's ID
  start: task start time
  end: task end time To say a task is completely scheduled means above parameters related to that task are all defined. Since some task has time constrain, to schedule a task is not to schedule the start time or end time but allocate and schedule the resource needed to execute the task.

One task cycle is defined to be $$GC = (FC - \underset{DB}{\phantom{xx}})^m RC$$

Where m is the number of segments to be fast copied before its cassette is returned to the cabinet.

All jobs have the following sequence of tasks:

$$[GC = (FC - \underset{DB}{\phantom{xx}})^m RC -]^n \quad (5)$$

where n is the total number of task cycles in the job.

For example, if $m=2$, $n=3$ the above expression will be:

$$GC = (FC - FC -)RC - GC \doteq (FC - FC -) RC - GC = (FC - FC -)RC$$
$$DB = \quad DB = \quad\quad\quad DB = \quad DB = \quad\quad\quad DB = \quad DB$$

where '=', '−' and '\' are sequence relation operators:

GC-FC means the end time of GC is no later than the start time of FC, i.e. $ET(GC) \leq = ST(FC)$ FC
  DB means $ET(FC) \leq = ST(DB)$
  (note '∴', ' ' are the same, but ' ' used for lower line)
FC1 − FC2

DB1 = DB2 means   $ET(FC1) \leq = ST(DB1)$,
                           $ET(FC1) \leq = ST(FC2)$,
                           $ET(DB1) = ST(DB2)$,
                           $ET(FC2) \leq = ST(DB2)$, Now it is more clear that expression (5) is the linear constrain for the linear programming problem of AR mentioned earlier.

Task ID comprises JOB ID and task type and task cycle. Therefore from task ID and expression (5) what the preceding or the next ID is can be identified. The Pre1 and Pre2 in (4) are not necessary as a result.

Resource Busy Table (RBT) such as buffer busy table is a queue contains

Queue-ID: (task-ID, start, end)$^j$     (6)

where
  i-th end time $\leq = $ i+1-th start time with $i<j$
  and each task is executing or executable.

The Scheduled Task Table (STT) is a two dimensional table. One dimension is for job, another dimension is for task. Each job has one task cycle on STT. When one task on the STT just completed its execution, it is deleted from STT and next task of the same job will be scheduled and add to the STT.

For an on-line job, DB1 must be immediately followed by DB2. In another words, the start time of DB2 is the end time of DB1. For a batch job, the expression (5) can have '=' replaced by '−'. In expression (5), m+n equals to the total number of segment in the record to be displayed. Where m is integer between 1 and a small number assigned by system manager, say 3.

In TAM described before, we defined FC to have the same length for all cycles and all jobs. It is the same situation for DB. But GC, RC may be variable due to different cassette locations. If we use the maximum GC/RC as the standard GC/RC length for all task cycles of any job, and using the diagram of FIG. 16, it is not difficult to see the following:

If one complete task cycle can be scheduled for each job of a list of concurrent jobs, all the rest cycle of each job can be scheduled without interruption.

The primary function of ARS (analog resource scheduler) is to create and schedule tasks for the jobs requested by the users with minimum waiting time for each job. This is a linear programming problem since expression (5) can be converted to linear inequalities. This can also be classified as a heuristic search problem in artificial intelligence. Both approachs need extensive processing time to get solutions for those nontrivial cases. Since the dynamic nature of the problem which is due to the constant changing of the availability of the resources, the extensive processing time is not acceptable. New approach is needed to solve this interlaced analog resources scheduling problem. The hints of the approach are:

The solution must use some of the boundary conditions(ST/ET).

The shuttle and play decks are most scarce resources.

Keep one and only one task cycle of tasks for each unfinished job in the Scheduled Task Table.

Must schedule the first cycle tasks immediately.

For every $\frac{1}{2}$ L time interval, a Time Trigger (TT) will be sent to the scheduler. The scheduler then updates Unfinished Job List (UJL), STT, RBT and resource controllers so that When the task start time is less than the current time minus L, the corresponding resources controller will be notified.

When the task end time is less than the current time plus L, the task will be deleted from STT, RBT and the next task (if any) will be scheduled and added to the STT, RBT. If this end task is the last task of a job, this job will be deleted from UJL.

There are two reasons a job can be interrupted. First, it is the hardware failure or unavailable, second it is the users cancellation. When there is a job to be canceled, ARS will delete that job from UJL. Also STT, RBT and other tables will be updated. A set of post interruption tasks (such as to reposition the tape and return the cassette) may be created to maintain the integrity of the resources.

There is another important factor to affect schedule: How to set a task start time when there are infinite number of choices available. For example, if a non-first cycle GC is to be scheduled into a resource spare time interval STI which is larger than GC, there are infinite ways to put GC into said STI. But the boundary condition mentioned before suggested that G should first try to match into either beginning or end of STI. Similarly, this is true for FC. The minimum waiting solution for the first task cycle scheduling problem must include one task whose start time ST or end time ET is equal to its STI's ST or ET.

Another strategy is that when there is no resource nor prerequisite problem, a task should have its start time be set to the earliest possible time. This will make reschedule easier whenever it is necessary. A deck is not available until RC for that deck is started. Therefore, in the deck queue each end time of a task is not necessary the end time of the FCd task but the start time of RC.

A time-window finder logic will find a spared time interval STI which is greater or equal to the time interval of a new task to be inserted into the queue. If no time-window is found for all queues of the needed resource, the logic will try to shift one of the preceding or the following task either to the left or the right to create a window for said new task. This may create a chain reactions to reschedule other tasks and resources. When all choices from all queues compared, the one with least reschedule needs should be selected. If the shift is fruitless, the new task should be added to the end of the task of a queue having an earliest end task time. The following are tasks can not be shift (the tasks in the parentheses makes the shift impossible):

tasks unable to shift to right: DB, FC( DB), GC(−FC DB)

tasks unable shift to left: DB, FC( DB), (FC−)RC.

When a task is rescheduled to the right usually only the tasks follows it will be rescheduled. But when RC is rescheduled, the FC immediately preceeding the RC should be rescheduled. This is because the deck is not available for GC until RC frees it.

ANALOG COMMUNICATION CONTROLLER (FIG. 13)

The need of having an analog switching system is obvious. When a read/write head should be turn on/off is not a simple matter if there are hundreds of heads to be considered. According to the preferred embodiment of this invention, the analog communication controller (ACC) is more than a switching system. It can be programed to satisfy specific needs of the application.

A diagram for the analog communication controller (ACC) is shown on FIG. 13. The function of the ACC is to control the analog paths from input channels $I_1$, $I_2$ ... $I_m$ to output terminals $O_1$, $O_2$ ..., $O_n$ by specifying the digital control inputs $A_1$, $A_2$, ..., $A_k$. Where k is the smallest integer such that $$2^k >= m \times n + 1$$

The leftmost long block having input lines $A_1$, $A_2$, ..., $A_k$ and output lines S, $C_{11}$, $C_{12}$, ..., $C_{1n}$, $C_{21}$, ..., $C_{2n}$, ..., $C_{m1}$, ..., $C_{mn}$ is a decoder which will turn one of the output lines on when a set of signals (0 or 1) is input to $A_1$, $A_2$, ..., $A_k$. The next column has m x n number of special RS flip-flops each of which has the following function:

| S | R | output Q' |
|---|---|---|
| 0 | 0 | Q does not change |
| 0 | 1 | Q is changed to opposite value |
| 1 | 0 | Q set to zero |
| 1 | 1 | not allowed or never occur |

The output Q' is the opposite of Q. At certain situation such as initialization, all flip-flops' Q have to be set off. At this time decoder output line S has to be on. The output line $Q_{mn}$ of the mn-th flip-flop becomes the control input of the mn-th analog switching gate $G_{mn}$. The detail circuit of this known digital controled analog gate is shown on gate $G_{2n}$ where 4 diodes, 3 transistors and Zener diode (ZD) are used. The input signal must not exceed the range $-E$ to $+E$. The transist $-E$ is always on. When the digital input from FF is high (1), the transistor connected to $+E$ is on. The input and output points in the diamond shaped diodes acts essentially like short circuit (since low forward drops of the diodes). When digital input from FF is low (0), the top transistor is on, and $+E$ transistor is off, Four diodes are reverse biased and produces very high impedance output.

The top blocks are distributors which distribute analog input I to $I_1, \ldots I_n$ after input amplifier. This input amplifier provides signal conditioning in the form of gain trim, dc restoration, and input loss equalization. The input $I_{mn}$ will flow to output $O_{mn}$ through gate $G_{mn}$ when $FF_{mn}$ is on. The output lines $O_{1j}, O_{2j}, \ldots, O_{mj}$ merge to become output $O_j$. Hence, normally not more than one of the $O_{1j}, \ldots, O_{mj}$ should be on.

A communication control logic (CCL) and communication control table (CCT) must be maintained in the ACC to avoid invalid input array $A_1, \ldots, A_k$ to prevent more than one gate of $G_{1i}, G_{2i}, \ldots, G_{mi}$ to be on for each integer i between 1 and n, unless the mixing of the signals is desired. In other words, CCT contains the current on/off status of each gate $G_{ij}$, input $I_i$ and output $O_j$. CCL contains the logic to execute the rules previously mentioned and others such as certain input or output terminals are permanent off, one input may or may not connect to several or certain output terminals, and set priority among the terminals or paths. For example, when CPU requests a path from $I_i$ to $O_j$, CCL will look the CCT to see if $G_{ij}$ is on and $G_{1j}, G_{2j}, \ldots G_{mj}$ are off. If those rules and others being satisfied then an address set $A_1, \ldots, A_k$ is generated $G_{ij}$ set on and CCT is updated. Otherwise, CPU is notified that the request is rejected.

In addition, with the programability, it is easy to add to the ACC more functions such as tally (to indicate which terminals are on currently) and monitory (communication statistics).

When ACC has to handle bidirectional communication, two ACCs can be used. One ACC controlling one direction and the other one controlling the other direction.

If the number of inputs m and the number of outputs n are large, the number of gates and the number of paths mxn used in the ACC described before can be too large to be practical. Besides, in many applications the maximum number of input terminals being on at any time is considerably smaller than m. In this case additional serial ACCs can reduce the number of gates and total length of paths dramatically. For example if m=60, n=70 and if the maximum number of input terminals being on at any time is 10, two ACCs needed are 60 to 10 and 10 to 70. The total number of paths or gates of those two ACCs is 1300 which is much less than one ACC of 4200 paths or gates. If the communication distance between those 60 input terminals and those 70 output terminals is large, additional saving on cable lines is huge: 130 units vs. 10 units. Therefore, ACC is a building block for many analog communication control systems. This concept of ACC can be applied to digital communication. The only components changed are that the gates will be pure digital gates. The multiplexing is another powerful way to increase the efficiency in digital communication.

SYSTEM BLOCK DIAGRAM (FIG. 22)

The system block diagram is shown on FIG. 22 to show the control mechanism of major components. Like digital computer, the digital/analog computer also is controlled by the CPU. (For the parallel processor, a plural number of CPUs may be used) There is one digital/analog Memory Pack Accessor per digital/analog memory pack. The digital/analog Memory Pack Accessor is between CPU and other devices such as RAM, TMP (transporter micro processor), VSC (video servo controller), mount/unmount motor which is belong to that particular pack. The current position or status of the shuttle, tape drivers, are stored and constantly updated in the current position table (CPT) which is part of the Digital/analog Memory Pack Accessor controller's memory. But the current tape position for each tape in the pack is stored in CTPT (current tape position table). CTPT is stored in RAM of the memory pack. The analog (video) buffer controller is directly controled by CPU (through scheduler) not through the pack accessor controller. The analog (video) buffer is not directly controlled by buffer controller, it is through ACC and buffer servo controller.

SYSTEM FLOW DIAGRAM (FIG. 23)

FIG. 23 is the system flow diagram to show the scheduler and its relation to other components. The digital data is entered via digital monitor. If no corresponding record can be found in RAMs, CPU will send the rejection message back. Otherwise, corresponding internal record ID will then be found in a RAM by CPU. The Tape Operation System then use this ID, which contains pack ID cassette ID and record address in the tape, to locate the corresponding analog record. At mean time CPU will access the digital application data of said found record from RAM and display back to digital terminal. With the information from Tape Access Method, TOS trys to decompose the analog processing job into task cycles and schedule those tasks, one after another. On the scheduled execution time, the right transporter will pick up one of the N x M cassettes to an available player, fast forward the tape to the right position and fast copy segments of record to the available buffers. The buffers will read the copied segments, transmit to the destination terminal under the control of Analog Communication Controller. The ACC is controled by CPU under the TOS and its resources scheduler.

The address data from head drum will help the motor to position the tape at accurate field before process the tape.

GLOBAL AND LOCAL MODES OF THE RANDOM ACCESSIBLE MEMORY

According to the preferred enbodiment of this invention, there are two, global and local, modes for the RAM of a pack. When a local mode is chosen, the content of the RAM is restricted to the (digital) data which is related to that particular pack. Before the pack is mounted to the apparatus, the mode must be local. After the pack is mounted, the RAM has an option to become global mode. On global mode, the CPU can merge, sort the records in this RAM with the global file(s) which contains records of other pack's RAM. This offers a very efficient way to search a record.

Otherwise, all RAMs from every pack have to be searched to find out that a particular record is or is not in the system memory. In addition, the global mode provide an efficient way to use the RAM. Since the RAM from each pack will have some unused memory, after global mode, those unused memory can be merged as one big working storage for CPU to use.

The store-in or store-through methods can be used to update the global mode RAMs. A certain slack space must be reserved along the global file to prevent a long lasting ripple effect from inserting a record at beginning of the file.

Before a pack is dismounted from the apparatus, the RAM of that pack must be changed to local mode. The RAM must store and only store all the digital data related to that pack. This is not difficult, since each record has an ID, and the pack number is part of the record ID.

DISK PACK ALTERNATIVES (FIG. 26)

When it is preferred to use disk instead of tape, the memory pack concept can still be applied. The cabinet dimension will be different. The end effector may use vacuum cup instead of gripper. In case of digital disk, RAM of the pack may be replaced by a control disk which will be permanently mounted on one of the driver until the pack is to be dismounted.

FIG. 26 is the perspective view of a disk pack. There is a concave curve 723 on the entrance of each disk bin 727 to make the pick-up or return easier. A flaxible door 725 is movable upward or downward along the track 724 which is on the outeredge of cabinet 727 to prevent dust coming in and disk going out when the pack is not operating.

Since the disk head normally has only one speed, there is no need of buffer pool for fast copying function. Hence the number of concurrent users is limited to the number of available disk drivers (not shown). If the read speed is much faster than real time display speed, digital buffer may be needed to increase the number of concurrent users.

Since a disk head is cost less than a helical scan head, complete different approach can be used for the disk pack read/write mechanism. According to the preferred embodiment of this invention, more disk heads per disk pack than tape head drums per tape pack can be used to increase the efficiency. This method allows read/write head to enter each disk bin, and each disk can rotate independently whenever it is necessary. The pack can still be unmounted and shipped to other place. To make each disk be able to rotate independently, an asynchronized co-axis multi-shaft (ACMS) motor is needed.

ASYNCHRONIZED CO-AXIS MULTI-SHAFT MOTOR (FIG. 24, 25, 24A, 25A, 27)

ACMS motor is a device which, being located inside of a stack of co-axis disks or wheels, can transmit the torque or rotational movement to those disks or wheels. Each disk/wheel can be independently controlled by an electric pulse train to the windings for corresponding disk/wheel. FIG. 24, FIG. 25 are the cross section view of two ACMS motors with three poles and four poles correspondingly. 701, 702 are magnets and are permanent attached to the center of the driven disk/wheel. 703, 704 are iron poles with heavy windings 705, 706. FIG. 24A, FIG. 25A are the perspective view of core-axle without windings for motors in FIG. 24, FIG 25 correspondingly. In FIG. 24A, the core-axle has three sections 703, 711, 715. Each section is inside a permanent magnetic ring which is permanently attached to a disk. Hence, with the energized winding poles, both core-axles in FIG. 24A, FIG. 25A can drive three disks. The windings on the poles of each section have a set of wires go through channel 707 to connect an electric pulse generator. After the poles of a section being energized, the magnetic force between those poles and the corresponding magnetic ring will drive the disk/wheel accordingly. In essence, the magnetic ring acts like a rotor and iron poles like a stator in a traditional motor, except that the stator is inside the rotor. Part of the motor (rotor) becomes part of driven item (disk). The mounting of the disk pack should be vertical instead of horizontal. Since the winding core axle must be moved in/out the cabinet when the pack is mounted/dismounted. The mounting of the disk pack using ACMS motors may prefer vertical sliding instead of horizontal sliding as shown for tape pack mounting.

FIG. 27 is the cross section view of a ACMS motor inside the disk pack. 730 is the winding pole axle with three sections to drive three disks 738. After energized, the windings 706 on the poles 704 will create magnetic flux and interact with the ring magnet 702 to create torque to rotate the magnet. The shield 712 is to resist the magnetic flux leak to the disk 738. Since the turntable 738 is permanent attached on the ring magnet 702 and its shield 712, it will rotate with magnet whenever magnet rotates. There are an 0 ring 733 and ring hunch 732 as the bearing to reduce friction between turntable and the bin shelf 736. Since each disk may have a read/write head 734, and each disk can rotate independently, those disks can be processed simultaneously.

What is claimed is:

1. A data storage memory comprising:
   at least one data storage pack including:
   (a) a first data storage media containing a plurality of data storage units arranged in a predetermined matrix, said data storage units adapted to provide data in a format having relatively high capacity, and
   (b) a second data storage media electrically independent of said first data storage media and mechanically attached to said first data storage media, said second data storage media adapted to provide digital data in a format permitting relatively high accessing speed,
   processing means coupled to said second data storage media, said processing means including means to merge, sort and search said data of said second data storage media, said second media providing storage space for the main memory of said processing means;
   a plurality of bins in each of said data storage packs, each of said data storage units being housed in a respective one of said bins,
   each of said bins including a latching means, said latching means having a secure state which secures the respective one of said data storage units in said bin and an open state which permits a data storage unit to be moved out of said bin,
   each of said bins having a spring associated therewith for biasing the associated one of said data storage units against said latching means,
   said spring pushing said storage unit at least partly out of said bin when said latching means is in said open state.

2. A data storage memory system comprising:

a plurality of data storage packs each of said packs including:
  (a) a first data storage media containing a plurality of data storage units arranged in a predetermined matrix, said data storage units adapted to provide data in a format having relatively high capacity, and
  (b) a second data storage media electrically independent of said first data storage media and mechanically attached to said first data storage media, said second data storage media adapted to provide digital data in a format permitting relatively high accessing speed,
processing means coupled to each of said second data storage media, said processing means including means to merge, sort and search said data of said second data storage media, said second media providing storage space for the main memory of said processing means,
said second data storage media of each of said packs having a switch to set said second data storage media into one of two modes, a local mode and a global mode; when in said local mode, said second data storage media containing digital data related only to the ones of said first data storage media to which it is attached; when in said global mode, said second data storage media containing digital data from a plurality of said data storage packs.

3. A data storage pack comprising:
a first data storage media containing a plurality of data storage units arranged in a predetermined matrix, and
a second data storage media electrically independent of said first data storage media mechanically attached to said first data storage media,
said data storage units of said first data storage media adapted to provide analog data,
said second data storage media adapted to provide digital data in a format permitting relatively high accessing speed,
said second data storage media containing digital application data and digital control data, said digital control data serving to locate and select data in said data storage units of said matrix and to correlate the data from said matrix to corresponding portions of said digital application data,
each of said analog data storage units comprising a multi-record tape adapted to be played for the presentation of the data in one or more records contained thereon, said tape having a predetermined starting point,
each of said records being divided into a plurality of sequential segments,
each of said records having a first segment constituting the beginning of the record and a last segment constituting the end of the record,
said segments of each of said records being interleaved with one another along the length of said tape so that each of said records is distributed along a substantial portion of said tape,
said first segments and said last segments of said records being interleaved with one another at beginning portion of said tape, the intermediate segments of each of said records being interleaved with one another along positions of said tape further removed from said beginning portion of said tape,
the sequential accessing of said segments of a predetermined record requiring scrolling to said first segment of said predetermined record near the beginning of said tape and then scrolling along said tape to each of the intermediate segments of said predetermined record to an approximately central intermediate segment and then scrolling back through said tape to subsequent intermediate segments and finally to said last segment of said predetermined record positioned near the front of said tape.

4. A data storage memory system comprising:
at least one data storage pack, said pack comprising:
  (a) the first data storage media containing a plurality of analog data storage tape units arranged in a predetermined matrix,
  (b) a second data storage media electrically independent of said first data storage media mechanically attached to said first data storage media, said second data storage media including digital application data and digital control data, said digital control data serving to identify and locate selected data in said data storage units of said matrix and to corresponding portions of said digital application data,
player means adapted to play said data storage units of said matrix, and
mechanical means responsive to said digital control data and coupled to said analog tape to position the one of said analog data units having said selected analog data at said player means, and
said player means providing said selected analog data and corresponding digital application data in a format adapted for display,
said player means comprising two player decks for scrolling and playing said analog tape, and a head drum positioned between said player decks,
the axis of said head drum being oblique to a first plane which is parallel to said player decks and is contained within a second plane which is perpendicular to the first plane and which extends through the center line of said player decks,
two loading devices, one associated with each player deck to wrap said tape from either deck around either left or right side of said head drum,
each said load device comprising a pair of loading poles movable on a set of tracks surrounding said head drum and a pair of auxiliary poles movable on a second pair of tracks to guide the tape around said drum.

5. A data storage memory system comprising:
at least one data storage pack, said pack comprising:
  (a) a first data storage media containing a plurality of data storage units arranged in a predetermined matrix, said data storage units adapted to provide data in a format having relatively high capacity,
  (b) a second data storage media electrically independent of said first data storage media mechanically attached to said first data storage media, said second data storage media including digital application data and digital control data, said digital control data serving to identify and locate selected data in said data storage units of said matrix and to corresponding portions of said digital application data,
player means adapted to play said data storage units of said matrix, and
mechanical means responsive to said digital control data and coupled to said analog tape to position the one of said analog data units having said selected analog data at said player means, and said player means providing said selected analog data and corresponding digital application data in a format adapted or display, said player means comprising a mother reel and a plurality of satellite reels, said mother reel having a plurality of tapes wound in a nested spiral relationship thereon, each of said tapes having the same operational length, each of said satellite reels being associated with one of said plurality of tapes, an end of each of said plurality of tapes being connected to a separate one of said satellite reels, said mother reel and said satellite reels each being adapted to permit the simultaneous winding of each of said tapes between said mother reel and the one of said satellite reels with which each tape is associated.

6. A data storage memory system comprising:

multiple data storage pack, each of said packs comprising:
  (a) a first data storage media containing a plurality of data storage units arranged in a predetermined matrix, said data storage units adapted to provide data in a format having relatively high capacity,
  (b) a second data storage media electrically independent of said first data storage media mechanically attached to said first data storage media, said second data storage media including digital application data and digital control data, said digital control data serving to identify and locate selected data in said data storage units of said matrix and to corresponding portions of said digital application data, first and second ones of said data storage packs arranged in parallel stands, player means comprising multiple players positioned between said first and second stands, said players adapted to play said data storage units of said matrix, mechanical means responsive to said digital control data and coupled to said data storage units to position the one of said data storage units having selected data at said player means, said player means providing said selected data and corresponding digital application data in a format adapted for display, said mechanical means being a robotic device for carrying a predetermined data storage unit from a predetermined matrix location on one of a pair of parallel stand storage matrices to a work station, the two storage matrices having accessing faces opposed to one another and having an end effector with a gripper end and a body end, said gripper end being adapted to grip a predetermined unit at a predetermined location in one of the matrices when appropriately aligned therewith, said end effector being mounted for vertical and horizontal movement along a plane positioned between and parallel to the accessing faces of the matrices, motive means for simultaneously moving said end effector in a vertical and horizontal direction in said plane and to rotate said end effector 180 degrees about a vertical axis while said end effector is moving along said plane, a cable to transmit power and signal from a stationary to said end effector, means to avoid said cable being jammed by said moving end effector.

7. A data storage pack comprising:
a first data storage media containing a plurality of data storage units arranged in a predetermined matrix, and a second data storage media electrically independent of said first data storage media mechanically attached to said first data storage media, said data storage units of said first data storage media adapted to provide analog data, said second data storage media adapted to provide digital data in a format permitting relatively high accessing speed, said second data storage media containing digital application data and digital control data, said digital control data serving to locate and select data in said data storage units of said matrix and to correlate the data from said matrix to corresponding portions of said digital application data, each of said analog data units comprising a plurality of disks axially stacked relative to one another, each of said disks having a central opening defined by an inner rim, an electric motor for each of said multiple disk analog data units, said electric motor comprising:
  (a) a plurality of rotors and plurality of stators,
  (b) each of said rotors being associated with a separate one of said stators,
  (c) said stators being axially displaced from one another and being connected to one another on a common axis,
  (d) each of said stators having a plurality of radially extending poles and having a winding wound around said poles,
  (e) said windings for each of said stators being independent of one another and being adapted to be separately energized,
  (f) each of said rotors being an annular permanent magnet positioned radially outboard from the one of said stators with which it is associated,
  (g) said rotors being mechanically independent of one another so that each of said rotors can rotate independently of one another,
    whereby energization of the winding on one of said stators will rotate only the associated one of said rotors.

8. A data storage memory system comprising:
at least one data storage pack, said pack comprising:
  (a) a first data storage media containing a plurality of data storage units arranged in a predetermined matrix, said data storage units adapted to provide data in a format having relatively high capacity,
  (b) a second data storage media electrically independent of said first data storage media mechanically attached to said first data storage media, said second data storage media including digital application data and digital control data, said digital control data serving to identify and locate selected data in said data storage units of said matrix and to corresponding portions of said digital application data, player means adapted to play said data storage units of said matrix, and mechanical means responsive to said digital control data and coupled to said analog tape to position the one of said analog data units having said selected analog data at said player means, and said player means providing said selected analog data and corresponding said digital application data in a format adapted for display, multiple display devices coupled to said player means to permit simultaneous display of multiple different data, at least one buffer device coupled between said player means and said multiple display devices, said buffer devices providing a relatively high data transfer rate when recording data into said buffer and a relatively low data transfer rate when playing data of said buffer, and switching means to switch the connections between said player means, said buffer devices and display devices to permit uninterrupted display, said buffer device comprising a first set of heads to provide said high data transfer rate, said first set being N heads, said second set of heads to provide said low data transfer rate, said second set being M heads, the ratio of N to M being equal to the ratio of said high data transfer rate to said low data transfer rate.

9. The data storage pack of claim 1 wherein said second data storage media containing digital application data and digital control data, said digital control data serving to locate and select data in said data storage units of said matrix and to correlate the data from said matrix to corresponding portions of said digital application data.

10. The data storage pack of claim 9 wherein said data storage units of said matrix provide analog data.

11. The data storage pack of claim 2 wherein said second data storage media containing digital application data and digital control data, said digital control data serving to locate and identify data in said data storage units of said matrix and to correlate the data from said matrix to corresponding portions of said digital application data.

12. The data storage pack of claim 11 wherein said first data storage unit of said matrix provide analog data.

13. The tape cassette of claim 5 further comprising:
a plurality of driver posts, a separate one of said drive posts engaging each of said satellite reels, and
transport means to lift said reels off of said drive posts simultaneously and rotate said reels independent of said drive posts to predetermined positions for associating said satellite reels with different drive posts and to place said reels on said drive posts after said predetermined rotation,
wherein any one of said satellite reels and the associated one of said multiple tapes can be positioned on a predetermined one of said drive posts.

14. The device of claim 8 wherein said switching means comprise:
at least one switching control block, each of said blocks comprising:
(a) a plurality of analog input terminals,
(b) a plurality of analog output terminals,
(c) $n \times m$ analog paths, one path connecting each said input terminal and output terminal, where n being the number of said input terminals and m being the number of said output terminals,
(d) $n \times m$ digital controlled analog gates, each said gate controlling one said analog path,
(e) a decoder of k input lines and $m \times n$ output lines, where k being the smallest integer such that $2^k$ is no less than $(m \times n) + 1$, (f) $n \times m$ flip-flops, each said flip-flop being connected between each said output lines from said decoder and said gate to act as set-reset means, and a microprocessor, each of said control blocks being connected in parallel to said microprocessor, said microprocessor further comprising:
(a) a set of input and output means,
(b) a set of digital memory storing the current status of each said input terminal and output terminal and gate of each of said blocks,
(c) a set of processing logic storing, updating and executing application specified discrimination rules required to process the analog switching request, by either rejecting said request or generate output to said input lines of said decoder of each of said control blocks to make the switching change and to update the status of said terminals and gates.

* * * * *